US 008359580B2

(12) United States Patent
Gonzales et al.

(10) Patent No.: US 8,359,580 B2
(45) Date of Patent: Jan. 22, 2013

(54) SYSTEM AND METHOD FOR TRACKING TESTING OF SOFTWARE MODIFICATION PROJECTS

(75) Inventors: Jesus Orlando II Gonzales, Highlands Ranch, CO (US); Oliver Arao Arce, Hayward, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1364 days.

(21) Appl. No.: 11/964,367

(22) Filed: Dec. 26, 2007

(65) Prior Publication Data
US 2009/0171893 A1 Jul. 2, 2009

(51) Int. Cl.
G06F 9/44 (2006.01)
G06F 11/00 (2006.01)
(52) U.S. Cl. .................... 717/128; 717/124; 714/45
(58) Field of Classification Search .................... None
See application file for complete search history.

(56) References Cited

U.S. PATENT DOCUMENTS

| | | | |
|---|---|---|---|
| 6,098,182 A * | 8/2000 | Cowan | 714/45 |
| 6,381,604 B1 | 4/2002 | Caughran et al. | |
| 6,519,763 B1 | 2/2003 | Kaufer et al. | |
| 6,694,509 B1 * | 2/2004 | Stoval et al. | 717/124 |
| 6,721,941 B1 * | 4/2004 | Morshed et al. | 717/128 |
| 6,915,328 B2 | 7/2005 | Turnbull | |
| 7,295,836 B2 | 11/2007 | Yach et al. | |
| 7,490,319 B2 * | 2/2009 | Blackwell et al. | 717/124 |
| 7,587,636 B2 * | 9/2009 | Tillmann et al. | 714/45 |
| 7,657,872 B2 * | 2/2010 | Kelbaugh et al. | 717/124 |
| 7,742,585 B2 | 6/2010 | Otaka et al. | |
| 8,024,400 B2 | 9/2011 | Lin et al. | |
| 8,032,863 B2 * | 10/2011 | Kolawa et al. | 717/128 |
| RE43,553 E * | 7/2012 | Spinner | 717/128 |
| 2002/0049962 A1 * | 4/2002 | Kelbaugh et al. | 717/128 |
| 2003/0078679 A1 | 4/2003 | Sutton | |
| 2003/0083062 A1 | 5/2003 | Bartolome et al. | |
| 2004/0268142 A1 | 12/2004 | Karjala et al. | |
| 2005/0246207 A1 | 11/2005 | Noonan et al. | |
| 2006/0123389 A1 * | 6/2006 | Kolawa et al. | 717/124 |
| 2007/0094543 A1 | 4/2007 | Joshi et al. | |
| 2007/0254634 A1 | 11/2007 | Costa-Requena et al. | |

OTHER PUBLICATIONS

Oracle; Oracle Project Management; 2009 [online]; retrieved on Sep. 5, 2012; pp. 1-5; Retrieved from the Internet <URL: http://www.oracle.com/us/products/applications/057041.pdf>.*

Herman Schultz; Software Reportig Metrics; 1986 [online]; retrieved on Sep. 5, 2012; pp. 22.2.1-22.2.5; Retrieved from the Internet <URL: http://ieeexplore.ieee.org/stamp/stamp.jsp?>.*

(Continued)

Primary Examiner — Thuy Dao
Assistant Examiner — Hanh T Bui
(74) Attorney, Agent, or Firm — Walter G. Hanchuk; Cooley LLP

(57) ABSTRACT

A system for tracking the testing of a set of software modification projects in an install plan provides a centralized project database where the testers can update their progress of testing software modification projects as they perform the tests. The central database advantageously eliminates the need to contact individual testers of each and every project every time a status report needs to be generated. Instead, a manager can automatically generate status reports which contain the testing progress of particular projects in real-time to more accurately monitor what projects are on track and what projects may be falling behind schedule.

23 Claims, 27 Drawing Sheets

OTHER PUBLICATIONS

Thomas Ball and Sriram Rajamani; The SLAM Project: Debugging System Software via Static Analysis; 2002 [online]; pp. 1-3; Retrieved on Sep. 5, 2012; Retrieved from the Internet: <URL: http://citeseerx.ist.psu.edu/viewdoc/summary?>.*

PCT International Search Report for PCT/US08/84701 dated Jan. 22, 2009.
International Preliminary Report on Patentability dated Jun. 29, 2010 for PCT/US2008/084701.

* cited by examiner

CASQA Test View - Microsoft Internet Explorer provided by Inovant

CAS Test View — CASQA Website

Reports
- RTN List
- Completion %
- Interface
- Regression
- Integration
- Audit Trail
- Assign Lead
- Assign Admin 7155 Hits

| Maint | RTN No.* | CC | Name* | Install Date* | QA Proj Risk | For Member Testing | Interface |
|---|---|---|---|---|---|---|---|
| ☐ | | 00 | | | Low ▸ | ☐ | ☐ |

Choose Install Date: 7/27/2007 ▸

ADD RTN — 146

RTN List — 140

| Maint | RTN No.* | CC | Name* | Install Date* | QA Proj Risk | For Member Testing | Interface | Delete | Action |
|---|---|---|---|---|---|---|---|---|---|
| ☐ | 810713 | 01 | Plus Switch Integration Phase II Routing File | 7/27/2007 | Medium ▸ | ☐ | ☐ | ☐ | VIEW |
| ☐ | 811030 | 00 | VisaNet Cirrus Gateway | 7/27/2007 | Medium ▸ | ☑ | ☑ | ☐ | VIEW |
| ☐ | 811839 | 00 | ATMFC Service, Sys of Rec Modifications | 7/27/2007 | Medium ▸ | ☐ | ☐ | ☐ | VIEW |
| ☐ | 811839 | 01 | ATMFC Service, Sys of Rec Modifications | 7/27/2007 | Medium ▸ | ☐ | ☐ | ☐ | VIEW |
| ☐ | 811873 | 00 | Swedish Bilaterals | 7/27/2007 | Low ▸ | ☐ | ☐ | ☐ | VIEW |
| ☐ | 811876 | 00 | YPAY Domestic Germany | 7/27/2007 | Medium ▸ | ☐ | ☐ | ☐ | VIEW |
| ☑ | 812428 | 00 | VPP Rate Change for USPS (Tier 1A Fixed Price) | 7/27/2007 | Low ▸ | ☐ | ☐ | ☐ | VIEW |
| ☑ | 812433 | 00 | Discover ATM Fee Changes (Tier 1A Fixed Price) | 7/27/2007 | Low ▸ | ☐ | ☐ | ☐ | VIEW |

COMMIT CHANGES — 148

CASQA Test View - Microsoft Internet Explorer provided by Inovant

File Edit View Favorites Tools Help

Back | Address: http://insite/dept/CASQA/TestView/sclnt.asp | Go

Links: APF | Testview | PTO | eTracker | RTN Info | VFTS | Tools | Admin | SysIssue | MS-CIMIT | MS-Visactive | MS-Golf | OCC Golf | Hits GlobalDirectory  Last Name [    ]  First Name [    ]  GO    Search [    ]  GO ▸ Employee Services   ▸ Organization   ▸ News   ▸ Products and Services   ▸ Reference CAS Test View — Interface — InSite International — CASQA Website Reports
RTN List
Completion %
Interface
Regression
Integration
Audit Trail
Assign Lead
Assign Admin

| Interface Day# | Install Date MM/DD/YY | Run Date MM/DD/YY | % Test Data Created | No. of Trans. | % of Trans. Validated | Opened DRs | Deferred DRs | Cancelled DRs | PMXs | No. of Active DRs | | | |
|---|---|---|---|---|---|---|---|---|---|---|---|---|---|
| | | | | | | | | | | Sev 1 | Sev 2 | Sev 3 | Sev 4 |

Choose an Install Date [10/12/2007 ▸]

| Interface Day# | Install Date MM/DD/YY | Run Date MM/DD/YY | % Test Data Created | No. of Trans. | % of Trans. Validated | Opened DRs | Deferred DRs | Cancelled DRs | PMXs | No. of Active DRs | | | | Del |
|---|---|---|---|---|---|---|---|---|---|---|---|---|---|---|
| | | | | | | | | | | Sev 1 | Sev 2 | Sev 3 | Sev 4 | |
| 1 | 10/12/07 | 8/14/07 | 0 | | 0 | 0 | 0 | 0 | 0 | 0 | 0 | 0 | 0 | ☐ |
| 2 | 10/12/07 | 9/4/07 | 0 | | 0 | 0 | 0 | 0 | 0 | 0 | 0 | 0 | 0 | ☐ |
| 3 | 10/12/07 | 9/17/07 | 0 | | 0 | 0 | 0 | 0 | 0 | 0 | 0 | 0 | 0 | ☐ |

ADD INTERFACE

COMMIT CHANGES

7155 Hits

180

For website related questions, please contact Orlando Gonzales at 6(750)8043

InSite Home | Site Index | Contact InSite

Unless otherwise noted, this information is for Visa Internal Use Only and should not be duplicated, published, or disclosed in whole or in part.

CAS Test View

| Reports | RTN No. | Install Date MM/DD/YY | % Test Data Created | No. of Trans. | % of Trans. Validated | Opened DRs | Deferred DRs | Cancelled DRs | PMXs | No. of Active DRs ||||Def Apps|
|---|---|---|---|---|---|---|---|---|---|---|---|---|---|---|
| RTN List |  |  |  |  |  |  |  |  |  | Sev 1 | Sev 2 | Sev 3 | Sev 4 | Filler |
| Completion % |  | > |  |  |  |  |  |  |  |  |  |  |  |  |

Choose an Install Date: 10/12/2007

| Interface | RTN No. | Install Date MM/DD/YY | % Test Data Created | No. of Trans. | % of Trans. Validated | Opened DRs | Deferred DRs | Cancelled DRs | PMXs | Sev 1 | Sev 2 | Sev 3 | Sev 4 | Def Apps |
|---|---|---|---|---|---|---|---|---|---|---|---|---|---|---|
| Regression |  |  |  |  |  |  |  | ADD INTERFACE |  |  |  |  |  |  |
| Integration |  |  |  |  |  |  |  |  |  |  |  |  |  |  |
| Audit Trail | 811233-00 | 10/12/07 | 0 |  |  | 0 | 0 | 0 | 0 | 0 | 0 | 0 | 0 | ☐ View |
| Assign Lead | 811250-00 | 10/12/07 | 0 |  |  | 0 | 0 | 0 | 0 | 0 | 0 | 0 | 0 | ☐ View |
| Assign Admin | 811278-00 | 10/12/07 | 0 |  |  | 0 | 0 | 0 | 0 | 0 | 0 | 0 | 0 | ☐ View |
|  | 811336-00 | 10/12/07 | 0 |  |  | 0 | 0 | 0 | 0 | 0 | 0 | 0 | 0 | ☐ View |
|  | 811393-00 | 10/12/07 | 0 |  |  | 0 | 0 | 0 | 0 | 0 | 0 | 0 | 0 | ☐ View |
| 7155 Hits | 811736-00 | 10/12/07 | 0 |  |  | 0 | 0 | 0 | 0 | 0 | 0 | 0 | 0 | ☐ View |
|  | 811882-00 | 10/12/07 | 0 |  |  | 0 | 0 | 0 | 0 | 0 | 0 | 0 | 0 | ☐ View |
|  | 812171-00 | 10/12/07 | 0 |  |  | 0 | 0 | 0 | 0 | 0 | 0 | 0 | 0 | ☐ View |
|  | 812230-00 | 10/12/07 | 0 |  |  | 0 | 0 | 0 | 0 | 0 | 0 | 0 | 0 | ☐ View |
|  | 812300-00 | 10/12/07 | 0 |  |  | 0 | 0 | 0 | 0 | 0 | 0 | 0 | 0 | ☐ View |

COMMIT CHANGES

| RTN - CC and Name | QA Proj Risk | Active DRs | | | | % Complete |
|---|---|---|---|---|---|---|
| | | Sev 1 | Sev 2 | Sev 3 | Sev 4 | |
| R810713-24 Plus Switch | Low | | | | | 0% |
| R810955-00 Advanced Authorization | Low | | | | | 10% |
| R811030-00 VisaNet Cirrus Gateway | Low | | | | | 10% |
| R811233-00 Base-I & SMS Alignment Message Format and field Alignment | High | | | | | 3% |
| R811250-00* US Account Level Product Based Processing | Medium | | 4 | | | 40% |
| R811278-00* Adding Fomr. Factor / Technology Indicator to Visa Net | Medium | | | | | 21% |
| R811335-00 Limited Acceptance Expansion | High | | | | | 26% |
| R811363-01 Edit Pkg. Billing Automation (PC) | Low | | | | | 0% |
| R811393-00 VPP Modifications | High | 1 | 4 | | | 10% |
| R811736-00* Merchant Fuel sector Product changes | Medium | | | | | 0% |
| R811863-00* Merchant Category Code and International Floor Limit Additions and Revisions (Magstripe) | Medium | | | | | 40% |

FROM FIG. 14A

| | | | | | |
|---|---|---|---|---|---|
| R811867-00 | International ATM Fee Change | Low | | | 10% |
| R811882-00 | Changes to Chargeback Conditions | Medium | | | 52% |
| R811958-00 | Domestic Interchange Reimbursement Fees - VPAY Italy | Low | | | 3% |
| R811988-00 | Discontinue CRB & Exception File Distributions | Low | | | 46% |
| R812008-00 | Slovakian Cashback | Medium | | | 5% |
| R812119-00 | Modify Utility Pgm to Support Visa Bus Card Typ | Medium | | | 5% |
| R812171-00* | Expand CPS Small Ticket to Unattendend Environments | Low | 1 | | 60% |
| R812230-00 | Amex DE22 in 0110 | Low | | | 0% |
| R812300-00 | New MW Groups for non-PCI Compliance | High | | | 0% |
| | GRAND TOTAL | | 1 | 9 | 0 |

(*) For Member Testing

For website related questions, please contact Orlando Gonzales at 6(750)8043

InSite Home | Site Index | Contact InSite

Unless otherwise noted, this information is for Visa Internal Use Only and should not be duplicated, published, or disclosed in whole or in part.

FROM FIG. 16A

| Code T/O | TD/TC | Walkthru | TRR Gate | % TC Executed | No. of Trans. | % of Trans. Validated | % Complete | Opened DRs | No. of Active DRs |  |  |  | PMXs |
|---|---|---|---|---|---|---|---|---|---|---|---|---|---|
|  |  |  |  |  |  |  |  |  | Sev 1 | Sev 2 | Sev 3 | Sev 4 |  |
| CORE |  |  |  |  |  |  |  |  |  |  |  |  |  |
| 7/16/07 | 7/18/07 | 7/18/07 |  | 20% |  | 100% | 20% |  |  |  |  |  |  |
| RSI |  |  |  |  |  |  |  |  |  |  |  |  |  |
| 7/13/07 | 7/13/07 | 7/13/07 |  | 0% |  | 0% | 0% |  |  |  |  |  |  |
|  |  |  |  |  |  | Cancelled DRs |  |  |  |  |  |  |  |
|  |  |  |  |  |  | Deferred DRs |  |  |  |  |  |  |  |
|  |  |  |  |  |  | Total DRs |  |  |  |  |  |  |  |

RTN Percentage Completion: 10% ← 282

R811030 - 00: VisaNet Cirrus Gateway - View
QA Proj Risk : Low
Updated On: 7/23/2007

| Code T/O | TD/TC | Walkthru | TRR Gate | % TC Executed | No. of Trans. | % of Trans. Validated | % Complete | Opened DRs | No. of Active DRs |  |  |  | PMXs |
|---|---|---|---|---|---|---|---|---|---|---|---|---|---|
|  |  |  |  |  |  |  |  |  | Sev 1 | Sev 2 | Sev 3 | Sev 4 |  |
| RSI |  |  |  |  |  |  |  |  |  |  |  |  |  |
| 7/13/07 | 6/15/07 | 6/15/07 | N/A | 10% | 200 | 100% | 10% |  |  |  |  |  |  |
|  |  |  |  |  |  | Cancelled DRs |  |  |  |  |  |  |  |
|  |  |  |  |  |  | Deferred DRs |  |  |  |  |  |  |  |
|  |  |  |  |  |  | Total DRs |  |  |  |  |  |  |  |

RTN Percentage Completion: 10%

| | | RTN - CC and Name | Install Date |
|---|---|---|---|
| | ☐ | R810713 - 01 Plus Switch Integration Phase 11 Routing File | 7/27/2007 |
| | ☑ | R810713 - 24 Plus Switch | 7/27/2007 |
| | ☑ | R810955 - 00 Avanced Authorization | 10/12/2007 |
| | ☐ | R810955 - 00 RTD | 10/12/2007 |
| | ☐ | R811030 - 00 VisaNet Cirrus Gateway | 8/17/2007 |
| | ☑ | R811030 - 00 VisaNet Cirrus Gateway | 7/27/2007 |
| | ☐ | R811112 - 00 Extend Visa Electron Authorization Options to visa | 10/12/2007 |
| | ☑ | R811112 - 00 Extending Visa Electron Authorization Options to visa | 10/12/2007 |
| | ☐ | R811233 - 00 SMS MACing online Key Exchange | 8/17/2007 |
| | ☐ | R811233 - 00 Base-I & SMS Alignment Message Format and Field Alignment | 8/17/2007 |
| | ☑ | R811250 - 00 US Account Level Product Based Processing | 10/12/2007 |
| | ☐ | R811278 - 00 Adding Fomr Factor/Technology Indicator to Visa Net | 10/12/2007 |
| | ☐ | R811336 - 00 Do Enhanced Authorization Features | 10/12/2007 |
| | ☑ | R811336 - 00 Limited Acceptance Expansion | 8/17/2007 |
| | ☑ | R811360 - 00 Brazil NNSS New IRF Structure | 2/22/2008 |
| | ☑ | R811363 - 01 Edit Pkg Billing Automation (PC) | 10/12/2007 |
| | ☑ | R811393 - 00 VPP Modifications | 10/12/2007 |
| | ☐ | R811585 - 03 Brazil CPS Validation Change | 8/24/2007 |
| | ☐ | R811592 - 00 Thailand IRF Review | 11/2/2007 |
| | ☑ | R811736 - 00 Merchant Fuel sector Product changes | 10/12/2007 |

TO FIG. 17B

FROM FIG. 17A

| | | |
|---|---|---|
| ☐ | R811839 - 00 ATMFC Service, Sys of Rec Modifications | 7/27/2007 |
| ☑ | R811839 - 01 ATMFC Service, Sys of Rec Modifications | 7/27/2007 |
| ☐ | R811840 - 00 Plus Gateway ARR 4000 Report Updates | 8/24/2007 |
| ☐ | R811863 - 00 Merchant Catagory Code and International Floor Limit Additions and Revisions (Magstripe) | 10/12/2007 |
| ☐ | R811867 - 00 International ATM Fee Change | 10/12/2007 |
| ☐ | R811873 - 00 Swedish Bilaterals | 7/27/2007 |
| ☐ | R811876 - 00 VPAY Domestic Germany | 7/27/2007 |
| ☐ | R811802 - 00 Changes to Chargeback Conditions | 10/12/2007 |
| ☐ | R811958 - 00 Domestic Interchange Reimbursment Fees - VPAY Italy | 10/12/2007 |
| ☐ | R811988 - 00 Discontinue CRB & Exception File Distributions | 10/12/2007 |

FROM FIG. 18A

| Code T/O | TD/TC | Walkthru | TRR Gate | % TC Executed | No. of Trans. | % of Trans. Validated | % Complete | Opened DRs | No. of Active DRs | | | | PMXs |
|---|---|---|---|---|---|---|---|---|---|---|---|---|---|
| | | | | | | | | | Sev 1 | Sev 2 | Sev 3 | Sev 4 | |
| SMS OFF | | | | | | | | | | | | | |
| 7/18/07 | 7/27/07 | 7/27/07 | | 0% | | 0% | 0% | | | | | | |
| | | | | | | Cancelled DRs | | | | | | | |
| | | RTN Percentage Completion: 0% | | | | Deferred DRs | | | | | | | |
| | | | | | | Total DRs | | | | | | | |

R810955 - 00: Advanced Authorization - View
QA Proj Risk: Low
Install Date: 10/12/2007
Updated On: 7/23/2007

| Code T/O | TD/TC | Walkthru | TRR Gate | % TC Executed | No. of Trans. | % of Trans. Validated | % Complete | Opened DRs | No. of Active DRs | | | | PMXs |
|---|---|---|---|---|---|---|---|---|---|---|---|---|---|
| | | | | | | | | | Sev 1 | Sev 2 | Sev 3 | Sev 4 | |
| CORE | | | | | | | | | | | | | |
| 7/16/07 | 7/18/07 | 7/18/07 | | 20% | | 100% | 20% | | | | | | |
| RSI | | | | | | | | | | | | | |
| 7/13/07 | 7/13/07 | 7/13/07 | | 0% | | 0% | 0% | | | | | | |
| | | | | | | Cancelled DRs | | | | | | | |

| | | | | Integration Testing | | | | |
|---|---|---|---|---|---|---|---|---|
| | | | | Status For Install Date 10/12/2007 | | | | |
| RTN No | No: of Trans. | % Complete | Opened DRs | | No. of Active DRs | | | PMX |
| | | | | Sev 1 | Sev 1 | Sev 3 | Sev 4 | |
| 810764 - 00 | | | | | | | | |
| 810955 - 00 | | | | | | | | |
| 811233 - 00 | | | | | | | | |
| 811250 - 00 | | | | | | | | |
| 811278 - 00 | | | | | | | | |
| 811336 - 00 | | | | | | | | |
| 811393 - 00 | | | | | | | | |
| 811736 - 00 | | | | | | | | |
| 811882 - 00 | | | | | | | | |
| 811972 - 00 | | | | | | | | |
| 812171 - 00 | | | | | | | | |
| 812230 - 00 | | | | | | | | |
| 812300 - 00 | | | | | | | | |
| | | Cancelled DRs | | | | | | |
| | | Deferred DRs | | | | | | |
| | | Total DRs | | | | | | |

SYSTEM AND METHOD FOR TRACKING TESTING OF SOFTWARE MODIFICATION PROJECTS

FIELD OF THE INVENTION

The present invention relates to a data processing system, and more particularly a system for tracking testing of software modification projects.

BACKGROUND OF THE INVENTION

Making modifications or enhancements to software running in a live computer system requires careful planning, especially if the system is a large transaction processing system such as VisaNet™, which processes over one hundred million financial transactions (e.g., credit card transactions) per day. Typically, a set of software modification projects are grouped into an install plan which has a projected install date. On the install date, all of the modification projects in the install plan are released into an active or production system at the same time.

Each software modification project typically adds or modifies a particular feature. An example of a software modification project may be a feature to add a new transaction type such that the computer system can handle prepaid card transactions in addition to credit/debit card transactions.

In turn, each software modification project typically affects multiple software applications. For each affected software application, a set of test cases are developed and tested by an assigned tester against the software application to ensure that there are no bugs. When all of the applications in each of the projects in the install plan are fully tested, the projects are released into a live system at the designated install date.

Often, administrators, managers and software testers need to track the progress of testing the software modification projects of a particular install or a particular project within the install to assess where the potential problems lie and whether the projects can be released by the designated install date. Traditionally, the manager would either call or email individual lead testers to report the progress of testing the software modification projects. When all information has been gathered, the manager would then prepare a test progress report summarizing the test status of all projects. As can be appreciated, this process of tracking the progress of testing is very time consuming. Moreover, as some testers may be tardy in responding to the manager's request for status, the report may not represent the true testing status at a particular time.

Therefore, it is desirable to provide a system and method for more efficiently and more accurately tracking the progress of testing software modification projects.

SUMMARY OF THE INVENTION

According to one aspect of the invention, a system for tracking the testing of a set of software modification projects in an install plan is provided wherein each project affects one or more software applications. The system includes a project database and a project tracking module executable in a computer.

The project database stores a plurality of project data with each project data corresponding to a particular software modification project. Each project data contains a test progress indicator which is updatable by a tester as the test progresses.

The project tracking module is capable of retrieving selected project data from the project database and preparing a status report based on the retrieved project data. The report can include some or all of the software modification projects in an install plan. For each selected project, the status report contains a project progress value which is based on the test progress indicator stored in each project data. The project progress value, for example, is a percentage of testing that was completed for each project.

As can be appreciated, the present invention provides a centralized project database where the testers can update their progress of testing software modification projects as they perform the tests. The central database advantageously eliminates the need to contact individual testers of each and every project every time a status report needs to be generated. Instead, at any time a manager can automatically generate various types of status reports which contain the testing progress of particular projects in real-time to more accurately monitor what projects are on track and what projects may be falling behind schedule.

BRIEF DESCRIPTION OF THE DRAWINGS

FIG. 5 is a screen shot of a status report page through which a specific type of report is selected.

FIG. 6 is a screen shot of a project maintenance page through which a software project is added, deleted and modified.

FIG. 7 is a screen shot of a software application maintenance page through which software applications belonging to a particular project is added, deleted or modified.

FIG. 9 is a screen shot of an interface test maintenance page through which an interface test is added, deleted or modified.

FIG. 10 is a screen shot of a regression test maintenance page through which a regression test is added, deleted or modified.

FIG. 11 is a screen shot of an integration test maintenance page through which an integration test is added, deleted or modified.

Figure 12:
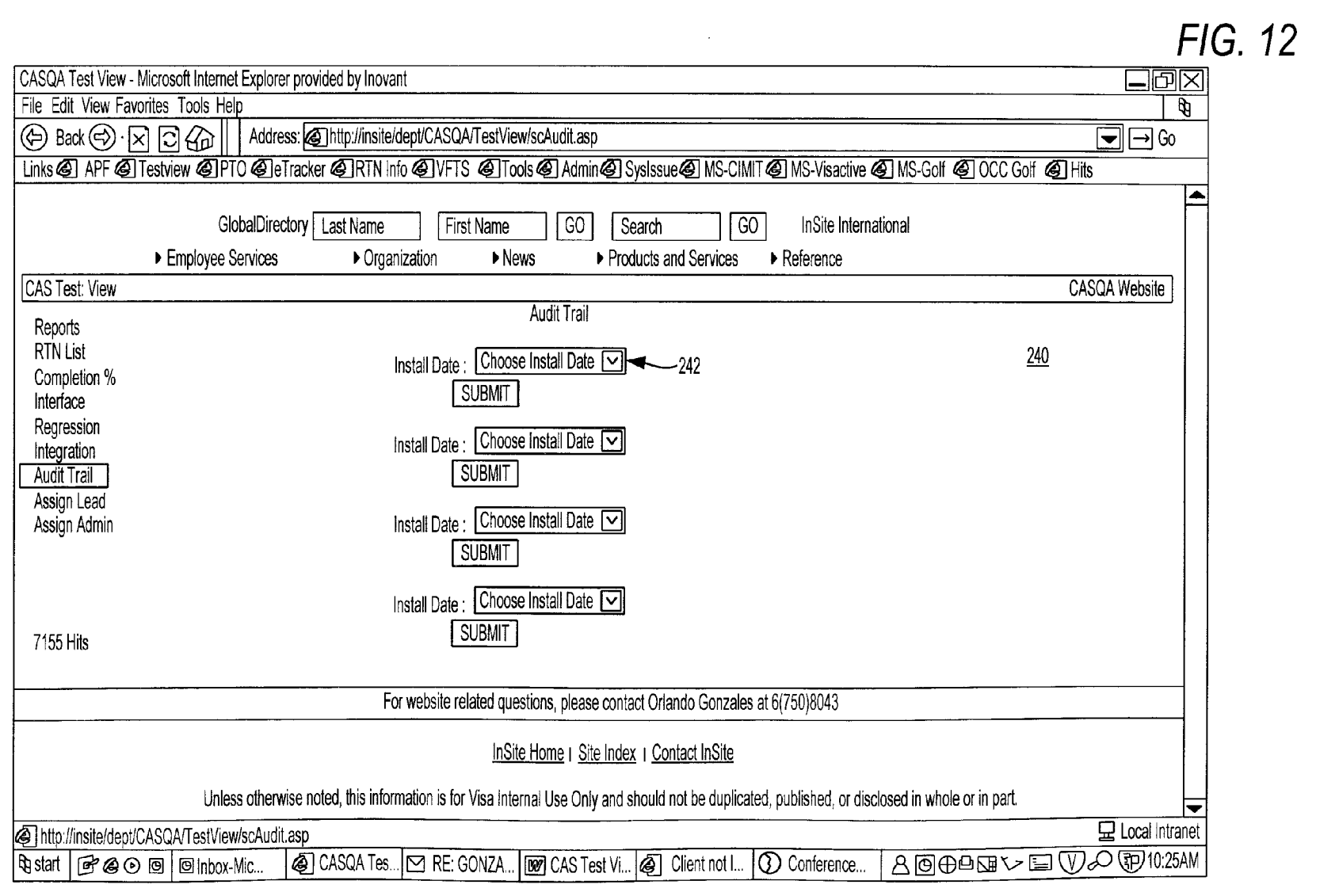

FIG. 12 is a screen shot of an audit trail page through which an audit trail for a particular software install plan is selected.

FIG. 14 is a screen shot of a status report page that summarizes the progress of a particular software install plan by software projects.

FIG. 17 is a screen shot of a personal status report page through which software projects across different software install plans for a particular software tester can be selected.

FIG. 18 is a screen shot of a personal status report page that summarizes the progress of software projects that have been selected through the screen shot of FIG. 17.

Figure 19:
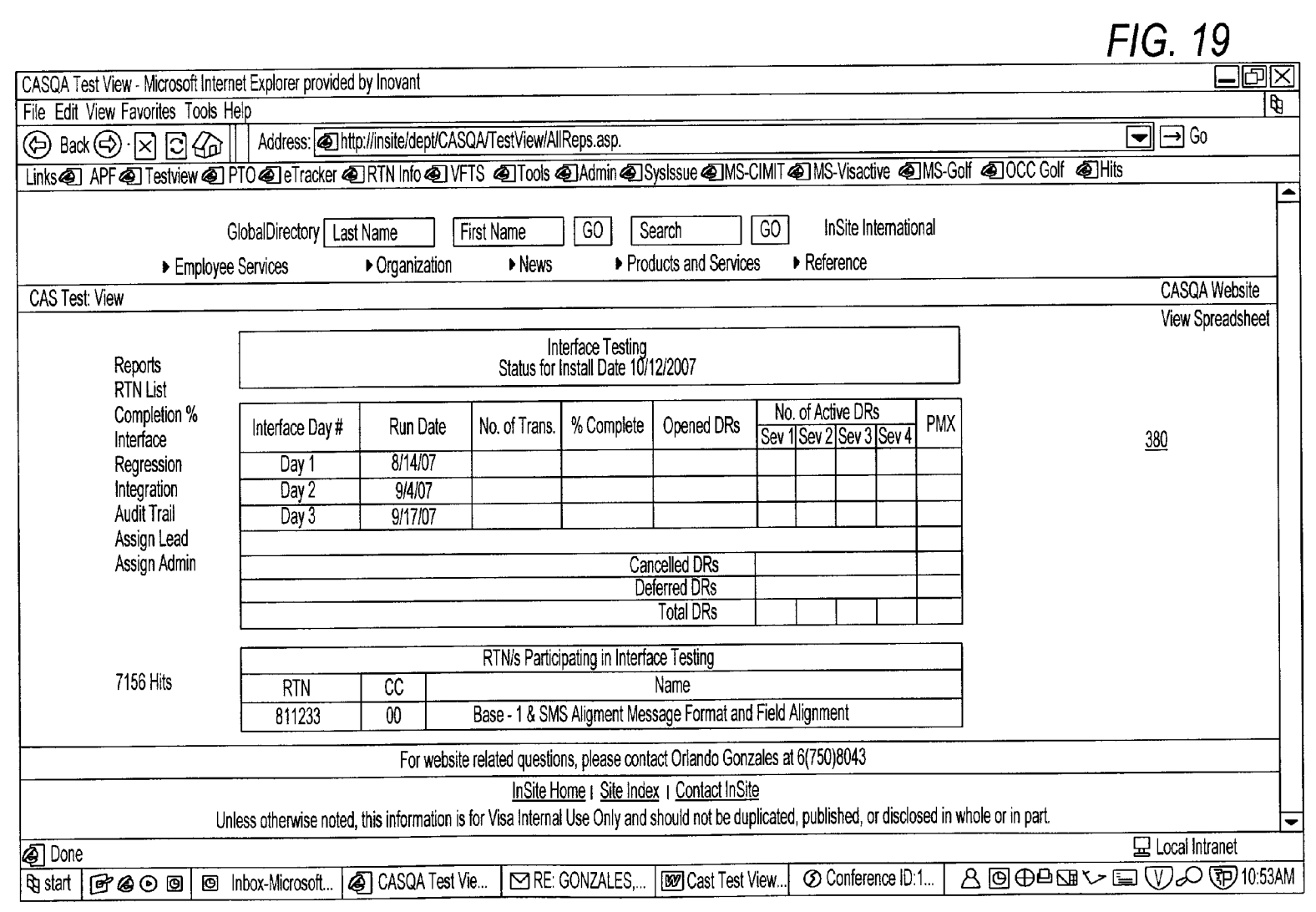

FIG. 19 is a screen shot of a status report page that summarizes the progress of interface tests.

Figure 21B:
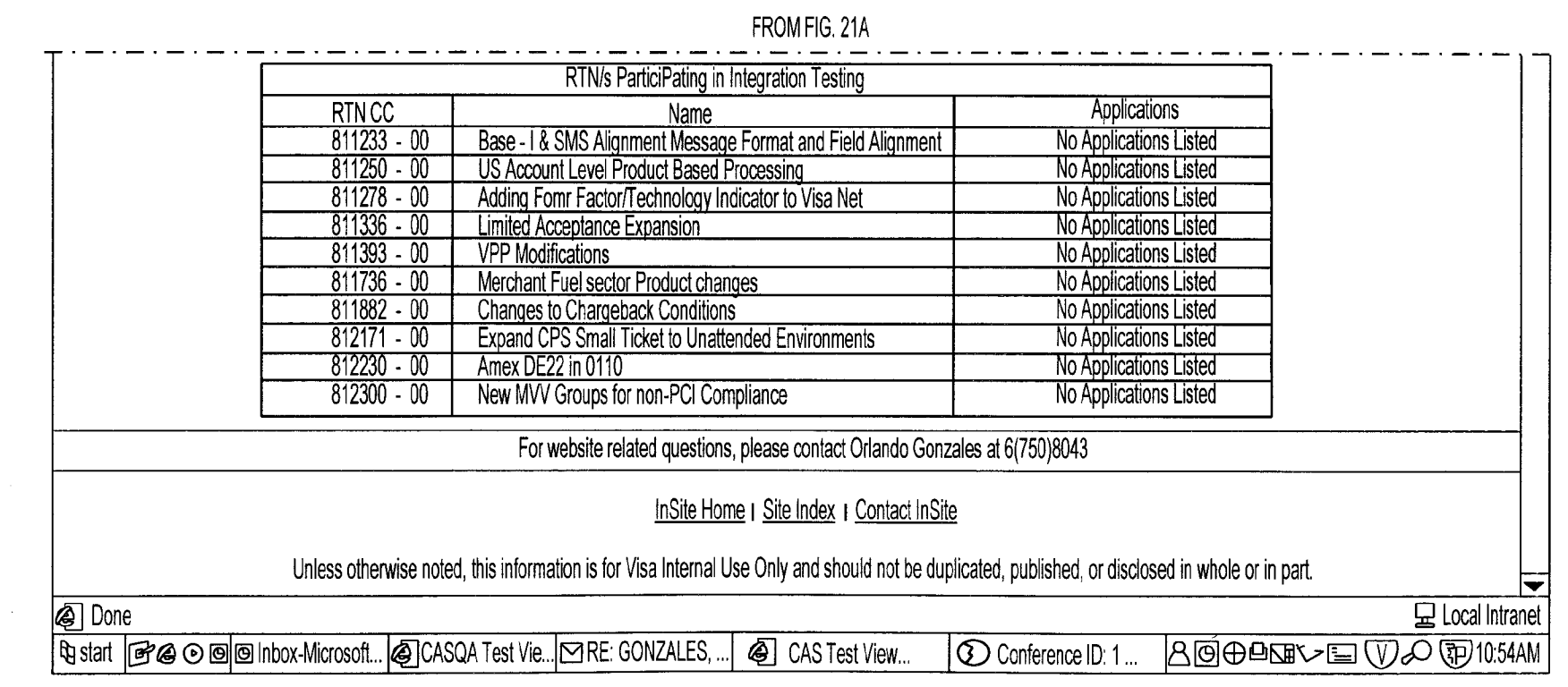

FIG. 21 is a screen shot of a status report page that summarizes the progress of integration tests.

DETAILED DESCRIPTION OF THE INVENTION

For purposes of this application, the terms "code", "program", "application", "software code", "software module" and "software program" are used interchangeably to mean software instructions that are executable by a processor.

Figure 1:
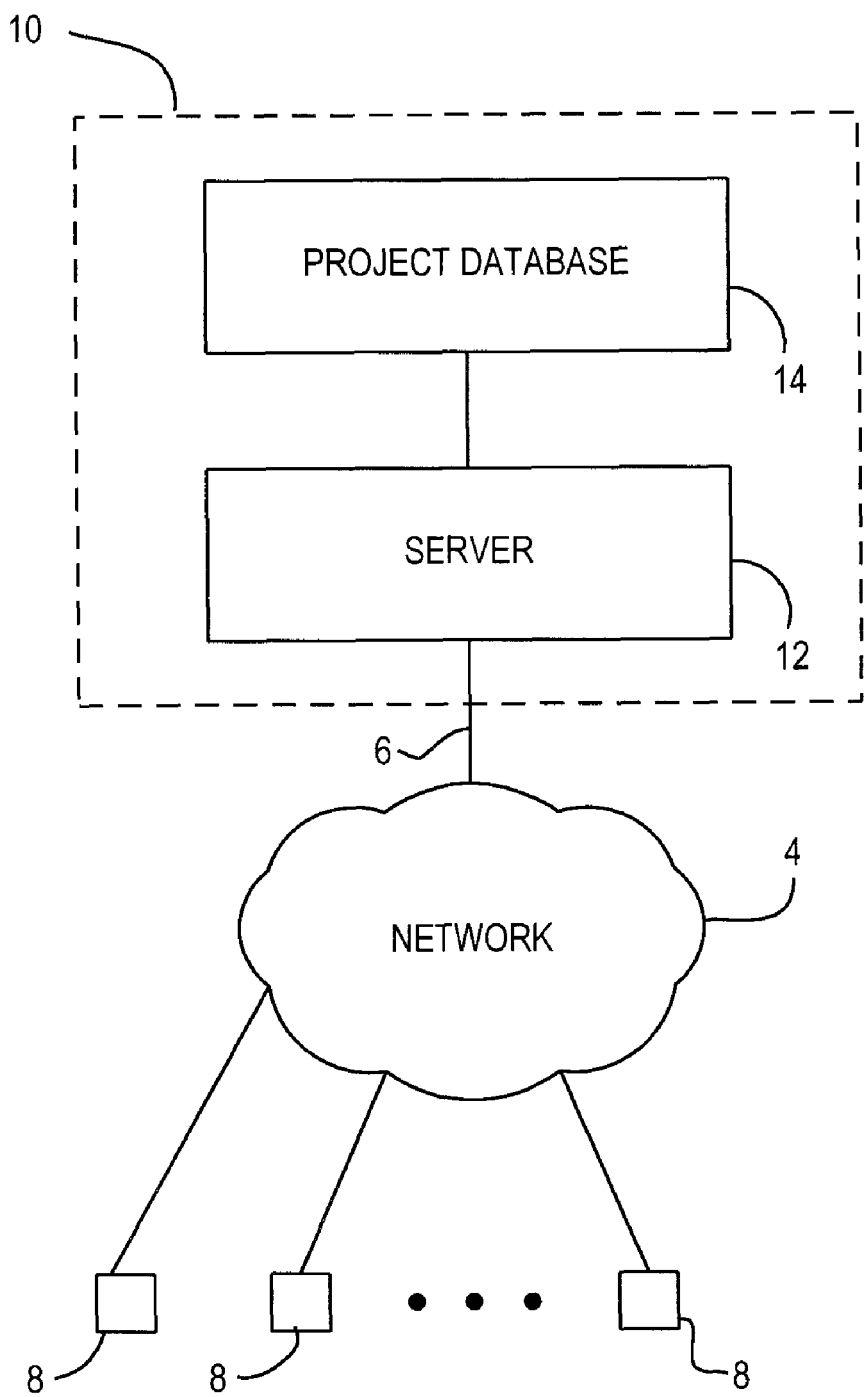
FIG. 1 is a block diagram of an exemplary software modification tracking system.

An exemplary block diagram of a software modification test tracking system 10 is shown in FIG. 1. The tracking system 10 contains a server 12 and a software project database 14 in communication with the server. The system 10 can be accessed by software testers and any manager interested in tracking the progress of testing a particular project or a set of projects. In the embodiment shown, the software project database 14 is a relational database using MS SQL Server from Microsoft Corporation of Redmond, Wash. although any type of a database management system can be used.

The system 10 is connected to a computer network 4 through a communication link 6. In the embodiment shown, the network 4 may be a private network such as an Intranet, private network such as an Internet, or a combination of private and public networks.

Figure 2:
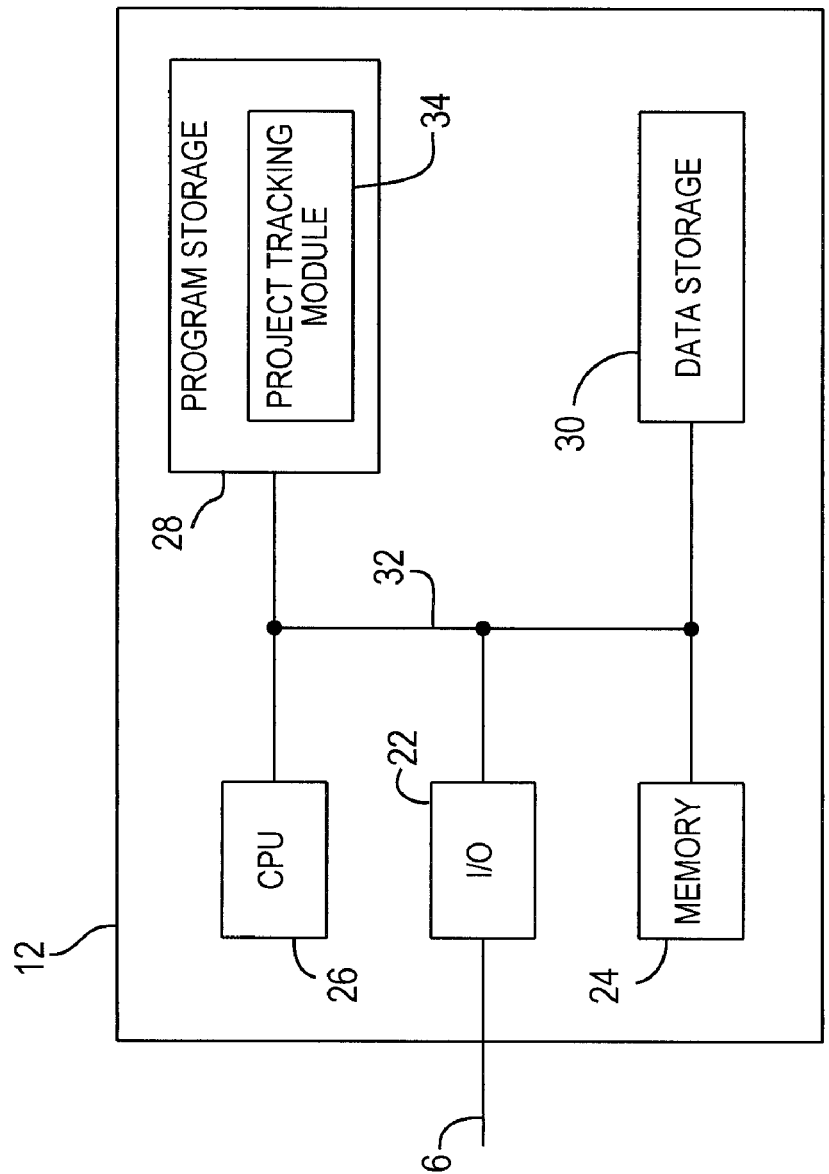
FIG. 2 illustrates a block diagram of a server computer that stores and executes a project tracking software module.

Referring now to FIG. 2, the server 12 of the present invention centrally tracks the status and progress of testing various software modification projects. In one embodiment, the software modification projects relate to software code for a processing system that processes financial transactions involving financial presentation devices (e.g., credit cards and debit cards) that are presentable to providers of goods or services. The server 12 includes a multitasking, real-time software technology that can concurrently handle multiple users.

The server 12 is connected to the communication link 6 through an I/O interface 22, which receives information from and sends information over the communication link 6 to the computers 8 of various users. The server 12 of FIG. 2 includes memory storage 24, processor (CPU) 26, program storage 28, and data storage 30, all commonly connected to each other through a bus 32. The program storage 28 stores, among others, a project tracking program or module 34. Any of the software programs in the program storage 28 and data from the data storage 30 are transferred to the memory 24 as needed and is executed by the CPU 26. In the embodiment shown, the project tracking module 34 is written in Active Server Pages (ASP) language.

The server 12 can be any computer such as a personal computer, minicomputer, workstation or mainframe, or a combination thereof. While the server 12 is shown, for illustration purposes, as a single computer unit, the system may comprise a group/farm of computers which can be scaled depending on the processing load and database size.

Figure 3:
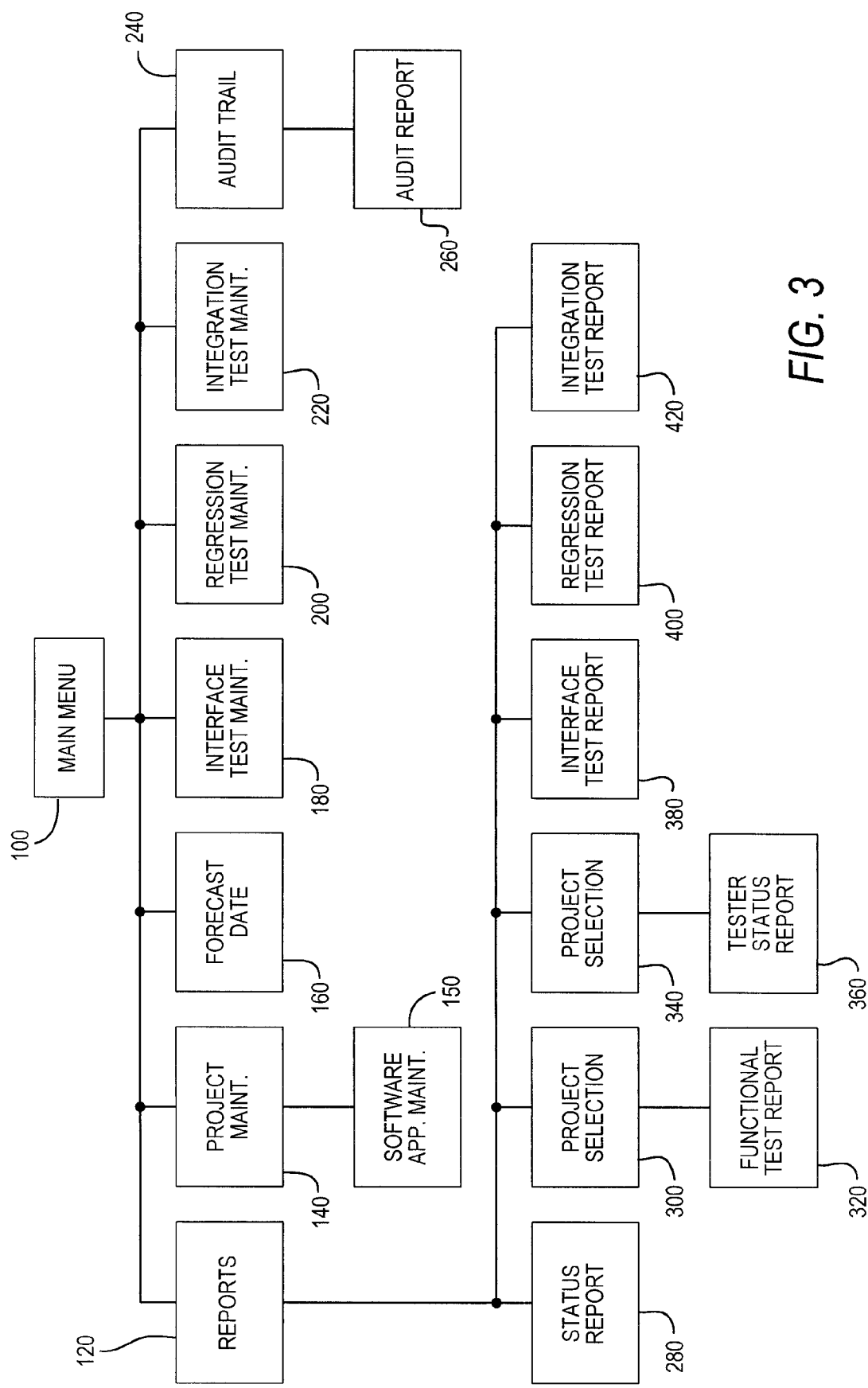
FIG. 3 illustrates a menu map of the project tracking software module.
Figure 4:
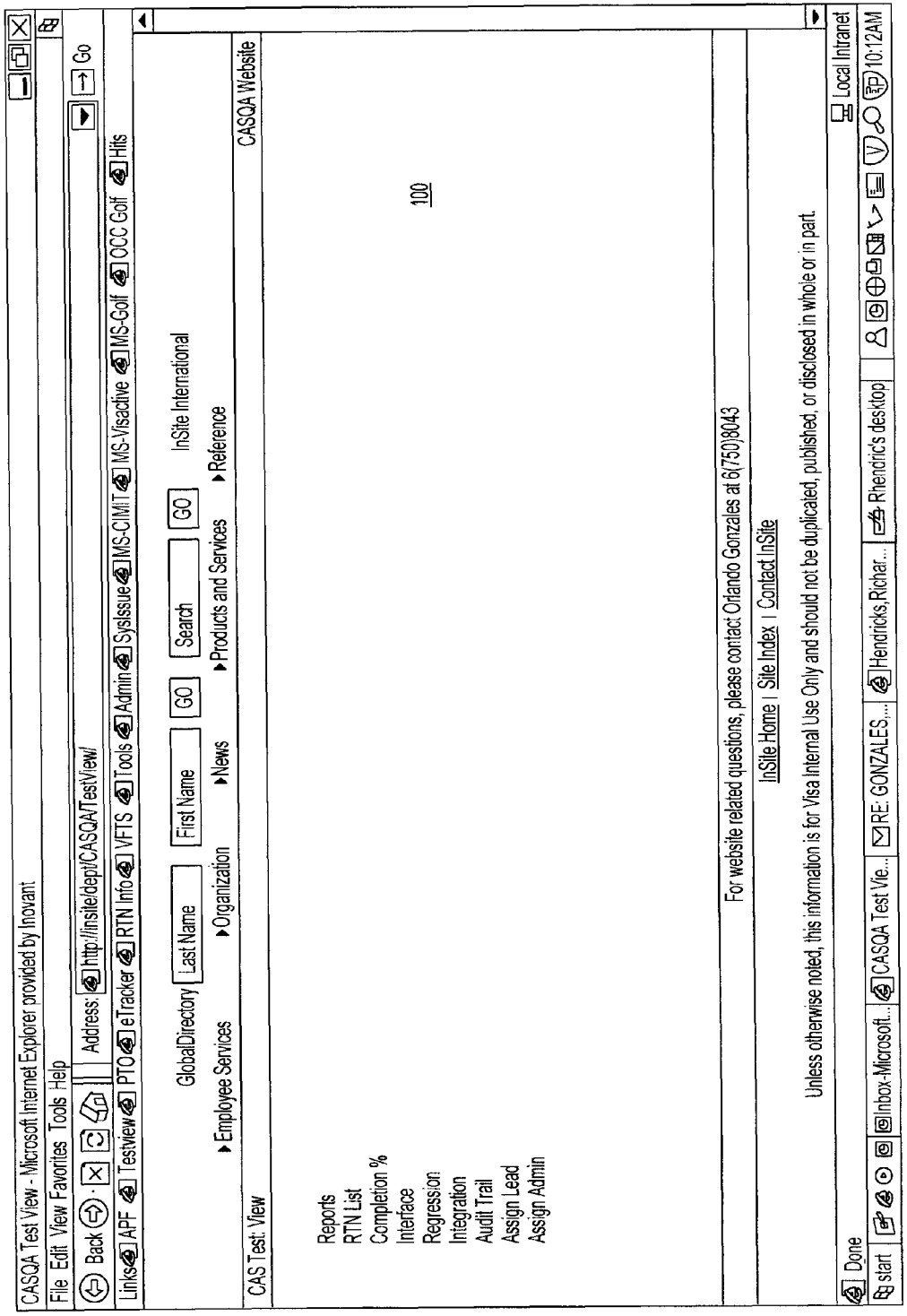
FIG. 4 is a screen shot of a main menu page of the project tracking software module.

FIG. 3 illustrates a menu map 60 of the project tracking software module 34 according to the present invention. The menu map 60 will be explained in conjunction with FIGS. 4-21. Referring to FIG. 4, after a user logs in through the computer 8 and runs the project tracking software module 34, the module generates a Main Menu web page 100 and transmits it across the network 4 to the user's computer 8 which is viewed via the user's web browser such as Microsoft's Internet Explorer. In the embodiment shown, the network 4 is an Intranet. The menu page 100 lists seven clickable links among others: Reports, RTN List, Completion %, Interface, Regression, Integration and Audit Trail. Clicking on each link respectively generates web pages 120 (FIG. 5), 140 (FIG. 6), 160 (FIG. 8), 180 (FIG. 9), 200 (FIG. 10), 220 (FIG. 11) and 240 (FIG. 12).

Figure 5:
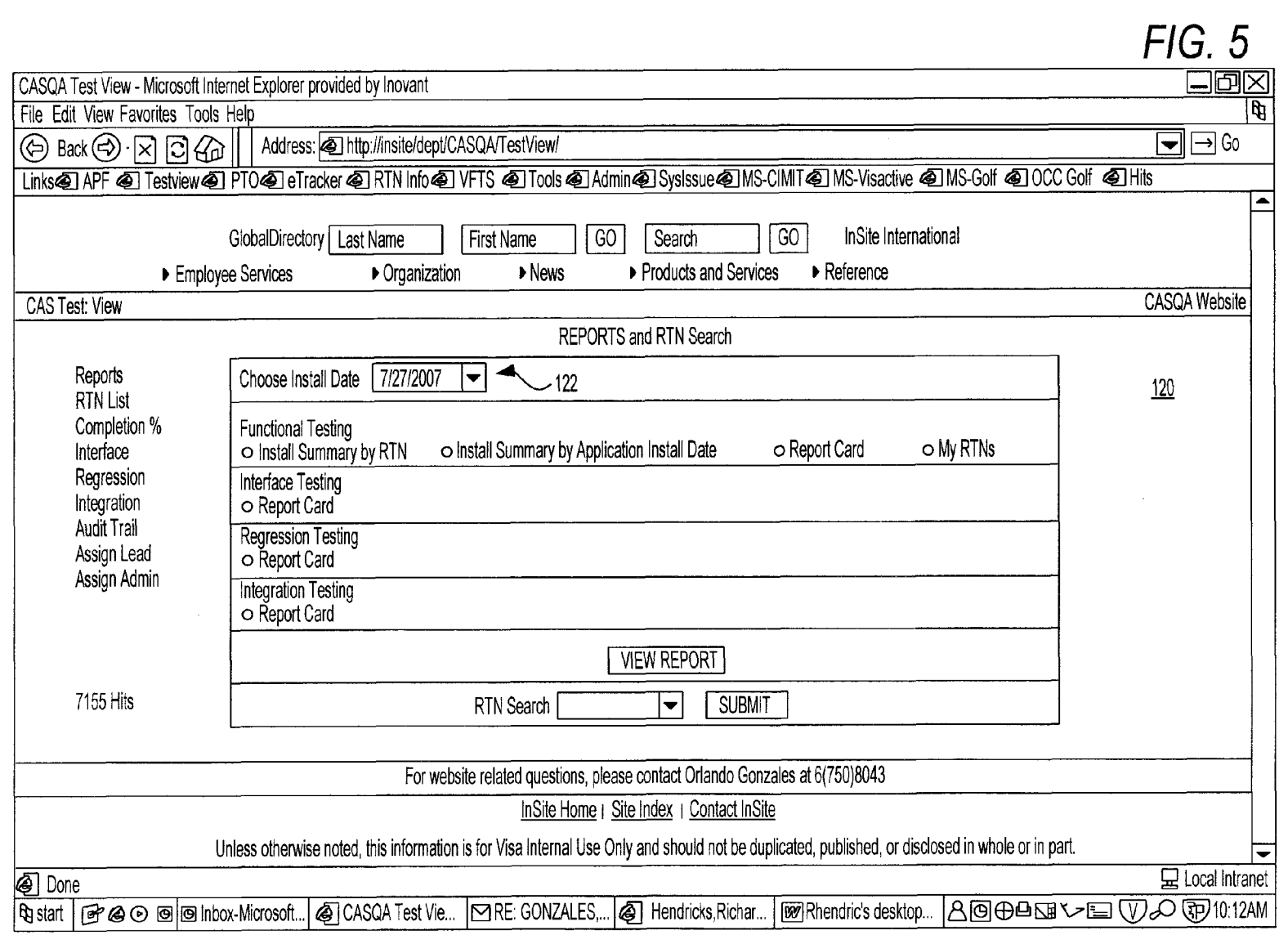

As can be seen in a status report page 120 in FIG. 5, there are four types of tests that are performed on the software features being modified or added: functional testing, interface testing, regression testing and integration testing. Functional testing is the most basic testing which is performed for each and every project. Functional testing is performed to ensure that the changes required by each project are working as required and expected. There are two types of functional testing: negative testing and positive testing. Positive testing involves ensuring that all valid data related to the enhancement are processed correctly through the card transaction processing system. Negative testing involves ensuring that invalid transactions or data combinations are properly processed through the processing system and that parts of the application that were deemed not to be impacted by the changes are in fact not affected.

Interface testing involves tests that are performed to ensure that upstream and downstream applications accurately communicate with the new enhancements and applied changes. Interface testing ensures that the code revisions have not negatively impacted or broken the communication paths or patterns between different applications.

Regression testing serves as a safety net and is performed to ensure that existing services or functionalities were not changed unless specifically detailed in the requirements as enhancements/changes being introduced in the implementation.

Integration testing is an extension of functional testing. In this test, all modules are combined and tested as a group to ensure that the changes required by the different projects are working as required as a group. The status report page 120 will be described in more detail later herein.

Referring to FIG. 6, the web page 140 is a project maintenance page (RTN List) through which software projects for a particular install plan are maintained by a test administrator. Each software project is tracked by and is given a number called a request tracking number (RTN). In the page 140 shown, all projects associated with an install date of Jul. 27, 2007 are maintained. The project maintenance page 140 has a top portion 142 through which a project is added and a bottom portion 144 through which selected projects are modified or deleted.

Each project has various attributes including "Maint", "RTN No.", "CC", "Name", "Install Date", "QA Proj Risk", "For Member Testing", and "Interface" which are maintained in the project database 14. "Maint" stands for maintenance and is normally used to indicate that the project is a bug fix in production, but it can also mean enhancements initiated solely by an interchange such as Visa U.S.A., Inc., and not by the member institutions themselves. For example, a "Maint" item may be an enhancement to increase the processing speed of the machines. "Name" refers to a project name or identifier. "RTN No." is a project identifier that identifies each project by a number. For example, the project named "VisaNet Cirrus Gateway" has an associated RTN No. 811030. "CC" stands for change control number and is used to indicate a change that has been requested by a customer or software developer. In the case of a card transaction authorization system, the customer is generally a financial institution that issues cards such as debit, credit or prepaid cards. "Install Date" refers to a particular projected install date at which time all of the projects associated with a particular install plan are released into a live system. "QA Proj Risk" refers to a project completion risk factor and can be low, medium or high. The risk factor is determined based on the complexity and importance of the project. "For Member Testing" is used to indicate whether a member financial institution needs to test the project. For example, a project that adds a new field in an authorization request message to a member bank needs to be tested by that bank to make sure that its computer system can recognize and handle the authorization request message with the added field. "Interface" refers to whether the project requires an interface testing.

To add a software project, the administrator would input various attributes described above in the appropriate input boxes in the top portion 142 and click the "ADD RTN" button 146. In response to the click, the computer 8 transmits the data regarding the new project to the server 12 through the network 4. The project tracking module 34 then adds the new project and displays the added project in the bottom portion 144.

The bottom portion 144 shows a table of existing software projects for a particular install. Each project is displayed in a single row. To modify attributes of an existing software project, the administrator would make the changes to the displayed attributes using a mouse of the computer 8 and click the "COMMIT CHANGES" button 148. The project tracking module 34 then makes the changes to the project database 14.

Once a project is added, the set of software applications that are affected or modified by the project need to be added. Clicking on a "VIEW" button 145 associated with the project brings the administrator to a software application maintenance page 150 (see FIG. 7) through which the affected software applications are added, deleted or modified.

In the page 150 shown, all applications associated with a particular project are maintained by the administrator. The application maintenance page 150 has a top portion 152 through which an application is added and a bottom portion 154 through which the applications are modified.

Each application has various attributes related to functional testing and include "Code T/O MM/DD/YY", "TD/TC MM/DD/YY", "% TC Executed" 153, No. of Trans.", % of Trans. Validated" 155, "Opened DRs", "Deferred DRs", "Cancelled DRs", "No. of Active DRs" which has sub-attributes of "Sev 1", "Sev 2", "Sev 3" and "Sev 4".

"Code T/O MM/DD/YY" refers to the date the software code is turned over to the quality assurance department for testing by testers. "TD/TC MM/DD/YY" refers to the date lead tester expects the testers to complete the test design and test cases. "% TC Executed" 153 refers to the percentage of test cases that have been executed. "No. of Trans." refers to the sum of all test transactions that have been created for all test cases of the application. Each test case can have a minimum of one transaction or thousands of transactions depending on the complexity of the test case. As an example, assume that the portion of software application being modified relates to exchange rate conversions for card transactions that occur outside of the U.S. One test case may involve Japanese Yen to U.S. dollar conversion while another test case may involve Canadian dollar to U.S. dollar conversion. For each test case, there may be a number of transactions that need to be tested. For the Japanese Yen to U.S. dollar conversion test case, for example, one transaction may be a credit card transaction from Japan with a U.S. issuer bank. Another transaction may be a credit card transaction from Japan with a Japanese acquiring bank. Still another transaction may be a credit card transaction from Japan with a U.S. acquiring bank and U.S. issuer bank.

"% of Trans. Validated" 155 refers to the percentage of executed transactions (among those in the executed test cases) that have been determined to be valid, i.e., the actual output matched the expected output. "% of TC Executed" 153 and "% of Trans. Validated" 155 comprise an application test progress indicator which is used to calculate an application test progress value. The application test progress value is calculated by multiplying "% of TC Executed" 153 by "% of Trans. Validated" 155 and indicates the percentage of tests that have been completed for the application.

Figure 7:
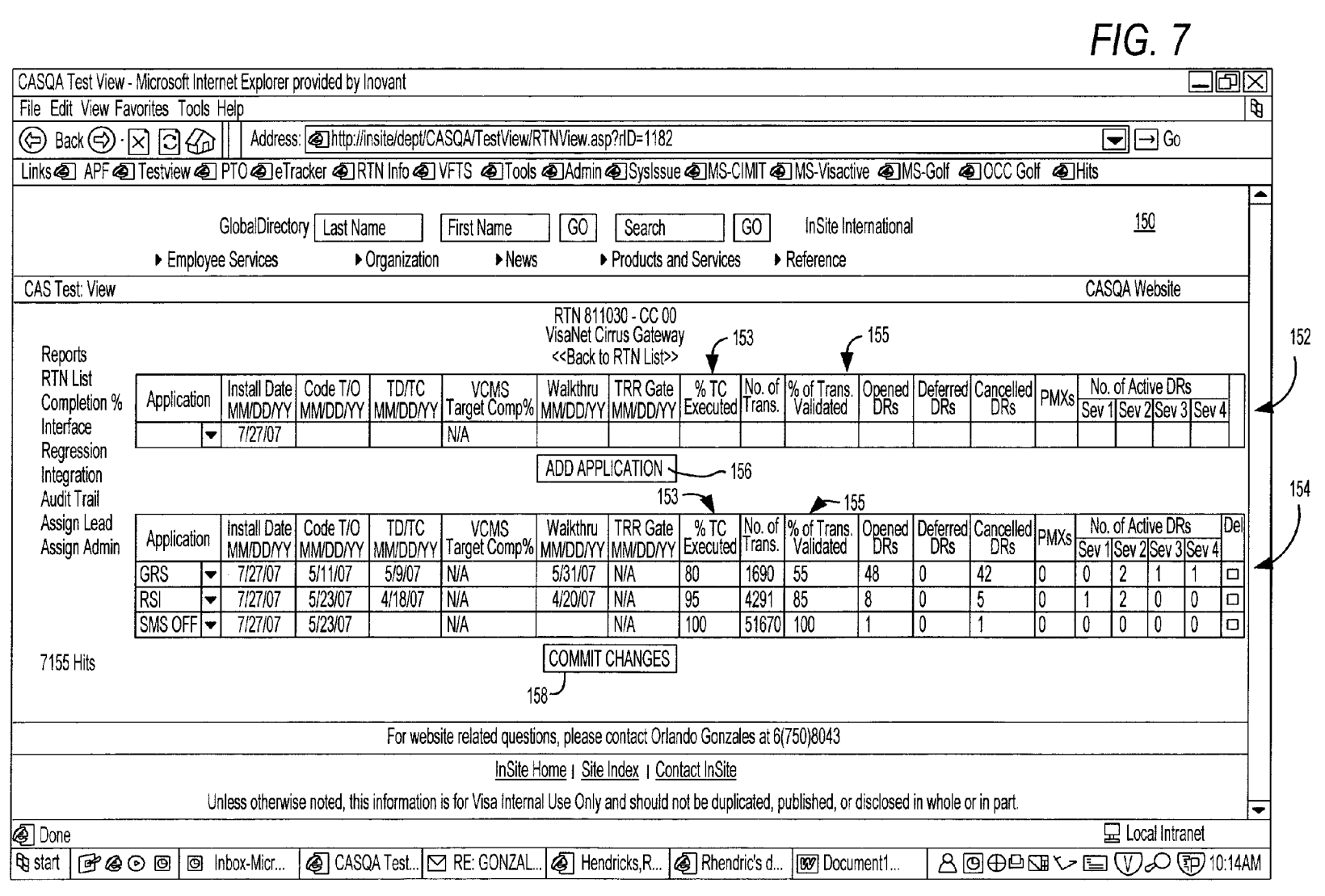

As an example, in the page 150 shown in FIG. 7, the application test progress value for an application called "GRS" is 44% as a result of multiplying 0.80 by 0.55.

"Opened DRs" refers to the number of opened discrepancy reports, i.e., bugs, that have been found. "Deferred DRs" refers to bugs that have been determined to be non-critical. "Cancelled DRs" means the number of discrepancy reports that have been created in error. "No. of Active DRs" refers to the number of discrepancy reports that are being worked on and have not been cancelled. This attribute is divided into four different severity levels with "Sev 1" being the most severe and "Sev 4" being the least severe. A discrepancy report having a severity of 1 prevents further testing until the bug is fixed or brought down in severity.

To add an application, the administrator inputs various attributes described above in the appropriate input boxes in the top portion 152 and clicks the "ADD APPLICATION" button 156. In response to the click, the computer 8 transmits the data regarding the new application to the server 12 through the network 4. The project tracking software module 34 then adds the new application and displays the added application in the bottom portion 154.

The bottom portion 154 shows a table of existing software applications for a particular project. As shown in FIG. 7, a project called "VisaNet Cirrus Gateway" affects three applications called "GRS", "RSI" and "SMS OFF". Each application is displayed in a single row. To modify attributes of an existing software application, the administrator would make the changes to the displayed attributes using a mouse of the computer 8 and click the "COMMIT CHANGES" button 158 to transmit the data to the server 12. The project tracking software module 34 then makes the changes to the project database 14.

The application maintenance page 150 is also the page where the software testers update any of the appropriate attributes in the bottom portion 154 as testing progresses.

Figure 8:
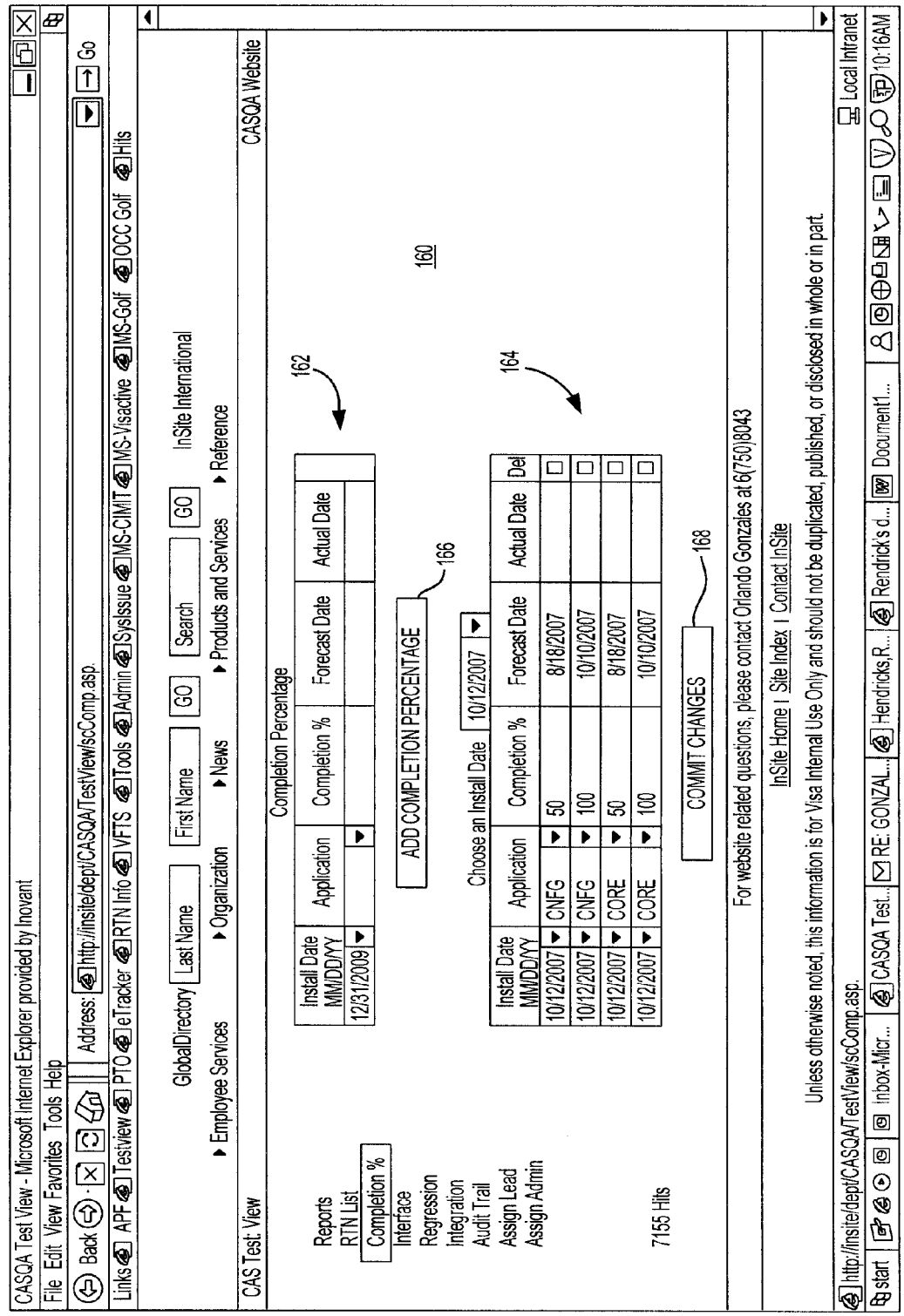
FIG. 8 is a screen shot of a forecast date page through which completion dates for various applications are forecast.

FIG. 8 is a screen shot of a forecast date page 160 in which the lead administrator for a particular install forecasts completion dates for various applications. For each application, the lead administrator reviews all of the projects that modify the application and estimates the date by which certain percentage of testing for that application is to be completed. The page 160 has a top portion 162 through which forecast dates for each application are added and a bottom portion 144 through which the forecast dates are modified.

Referring to the top portion 162, to add an application forecast date, the administrator would input the install date for the application, application name, completion percentage and the forecast date, and clicks on the "ADD COMPLETION PERCENTAGE" button 146. Typically, two forecast dates are added for each application. For example, 50% and 100% completion forecast dates are used. In response to the click, the computer 8 transmits the data regarding the new project to the server 12 through the network 4. The project tracking software module 34 then adds the new forecast date and displays the added forecast date in the bottom portion 164.

To modify attributes of an existing application forecast date, the administrator would make the changes to the displayed attributes using a mouse and click the "COMMIT CHANGES" button 168 to transmit the data to the server 12. The project tracking software module 34 then makes the changes to the project database 14.

Figure 10:
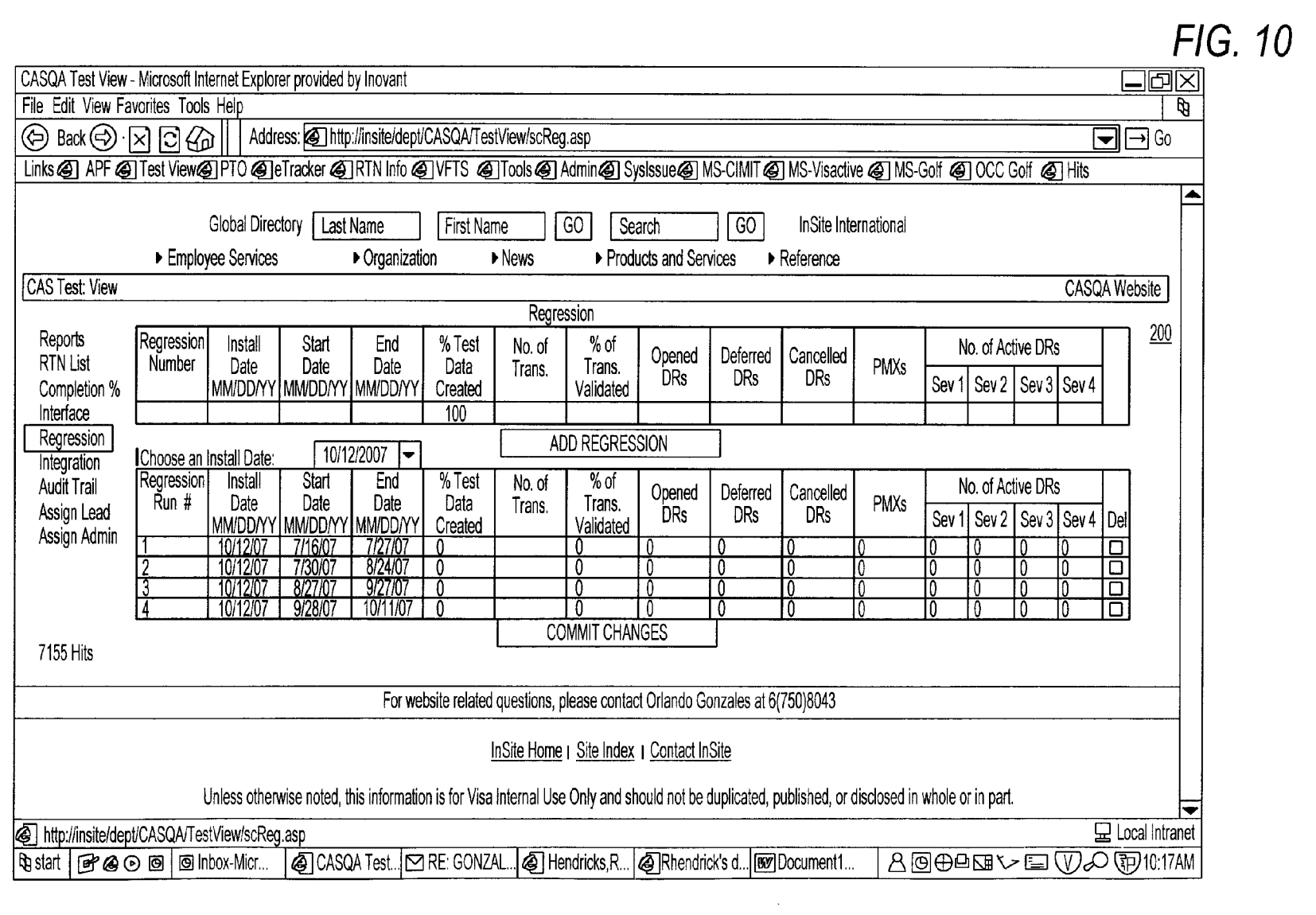

Similar to FIG. 7 for function testing, interface testing, regression testing and integration testing are added and modified through web pages 180, 200 and 220, respectively, through FIGS. 9-11.

As testing progresses, any tester can go to web pages 150, 160, 180, 200 and 220, and make changes to the attributes to reflect the progress of testing.

Figure 13:
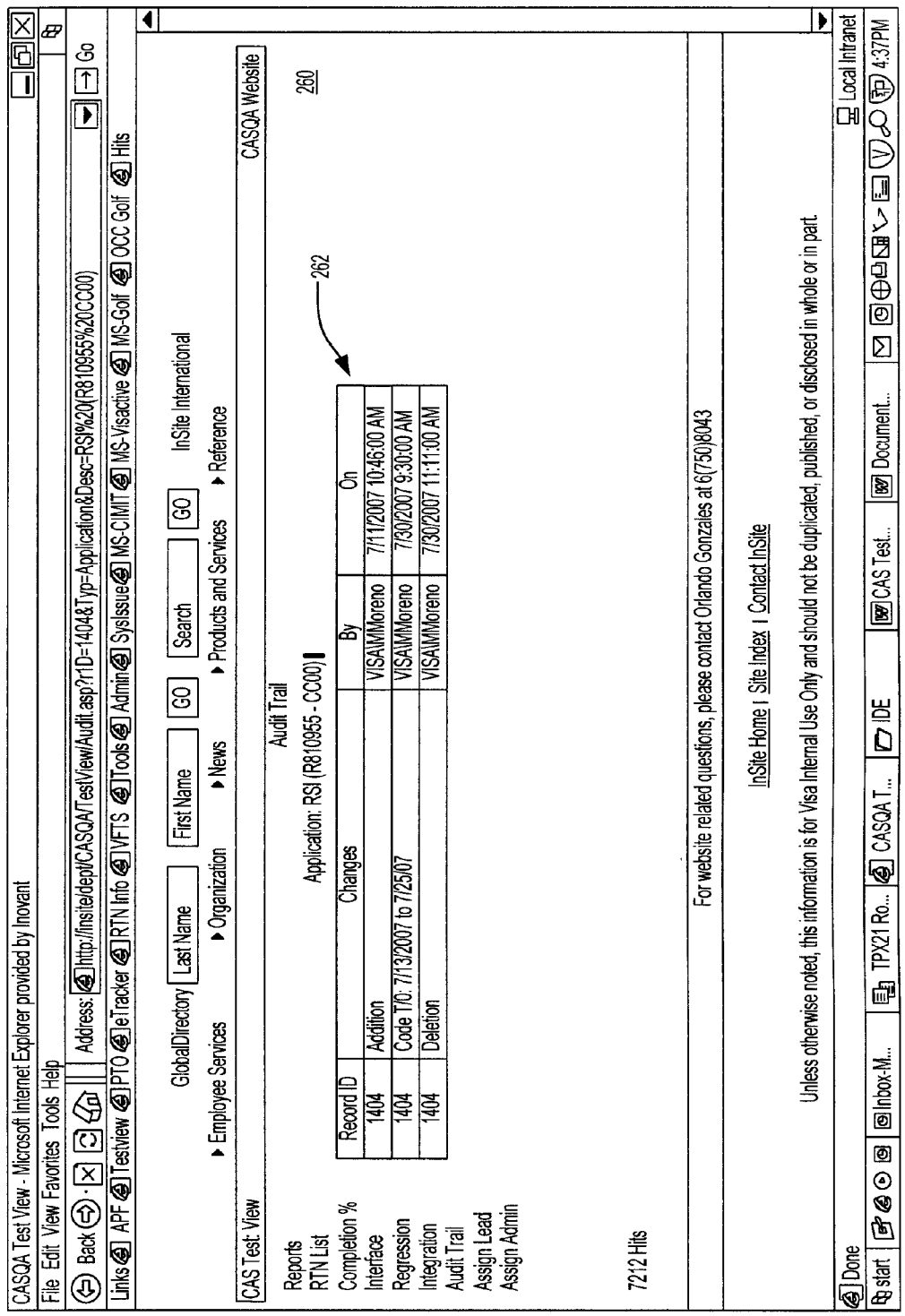
FIG. 13 is a screen shot of an audit report page containing an audit trail for a software application of a particular software project.

To ensure that unauthorized changes are not made, the project tracking software module 34 provides an audit trail by automatically recording any changes to the projects in the project database 14 including any addition, deletion and modification. By selecting a particular install date in a pull down menu 242, the audit trail report selection page 240 in FIG. 12 can be used to generate a complete or partial audit trail report for any install date. An exemplary report is shown in FIG. 13. The audit trail web page 260 show a report 262 for all of the changes that were made to an application named "RSI". The report 262 includes the tester's identity, the date the change was made and the details of the change. For example, the report shows that tester named MMoreno added application RSI for project 810955 on Jul. 11, 2007, changed the attribute of "Code T/O" (see FIG. 7) on Jul. 30, 2007, and deleted the application on Jul. 30, 2007.

Once the projects and applications for a particular install have been set up and testing is in progress, any user can generate a variety of status reports through a status report page 120 as shown in FIG. 5. As explained above, there are four different types of testing for which reports are available: functional testing, interface testing, regression testing and integration testing.

Within functional testing, there are four different types of status reports that can be generated by the project tracking module 34: by each project ("Install Summary by RTN"), by install date ("Install Summary by Application Install Date"), by selected projects within an install plan ("Report Card"), and by projects selected from all install plans ("My RTNs"). The "Install Summary by RTN" report is similar to the ("Install Summary by Application Install Date"), the difference being that the latter includes projects that have been installed earlier than the planned install date.

In the status report page 120, the user initially chooses an install date from a pull down menu 122. Selecting "Install Summary by RTN" and clicking "VIEW REPORT" generates a status report page 280 (see FIG. 14) that summarizes the progress of a particular software install by software projects. The report as shown in FIG. 14 includes, for each project, a project identifier ("RTN"), project name ("Name"), project risk ("QA Proj Risk"), number of active bugs ("DR") and their severity ("sev1" through "sev4") and project test progress value 282 ("% Complete") which represents the test completion percentage of the project.

For each project, the number of active bugs at a given severity level is derived by adding the number of bugs at the given severity level for each application being affected.

The project test progress value 282 for each project is derived as follows. First, for each application of a project, the project tracking module 34 calculates an application test progress value based on the application test progress indicator. Specifically, the application test progress value is calculated by multiplying the "% TC Executed" attribute 153 by "% of Trans Validated" 155 attribute which indicates the test completion percentage for the application. Second, for each project, the project tracking module 34 calculates the project test progress value 282 by averaging the application test progress values for all the applications of the project.

For example, in the software application maintenance page 150, the project test progress value is calculated by the following: $(0.80*0.55+0.95*0.85+1.00*1.00)/3$. Accordingly, the project test progress value is 75%.

Alternatively, instead of using "% of Trans. Validated", the project database 14 could track two attributes with one attribute representing the number of transactions executed and the other attribute representing the number of executed transactions that have been validated. In that case, "% of Trans. Validated" could be calculated simply by dividing the number of validated transactions by the number of executed transactions.

The status report page 280 of FIG. 14 also includes an overall test progress value ("Overall Install Completion Percentage") that represents the test completion percentage of the entire install plan. In the page 280 shown, the overall progress indicator is calculated by a weighted average of the project progress values 282 for all projects, the weight being dependent on the project risk factor. In the embodiment shown, the weights given for Low, Medium and High project risks are respectively 1, 2 and 3. Thus, the overall test progress value is calculated by multiplying each project progress value 282 by its weight of 1, 2 or 3, and adding them up for use as a numerator and by adding the total number of weights for use as a denominator. In the example shown in FIG. 280, the numerator is 5.82 and the denominator is 35. Accordingly, the overall progress value is 17%.

Figure 15A:
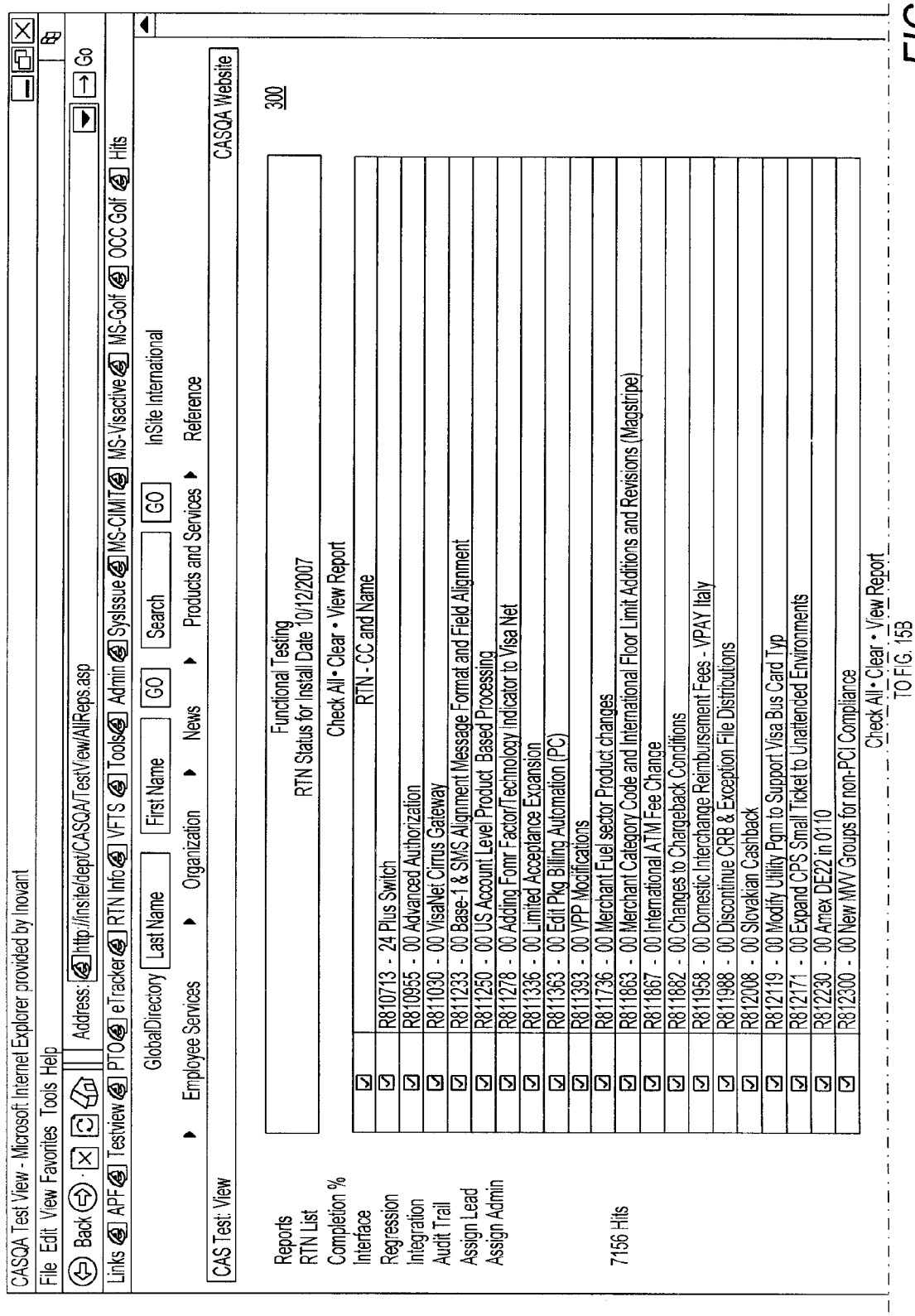
FIG. 15 is a screen shot of a report card page through which individual software projects for a particular software install plan can be selected.
Figure 15B:
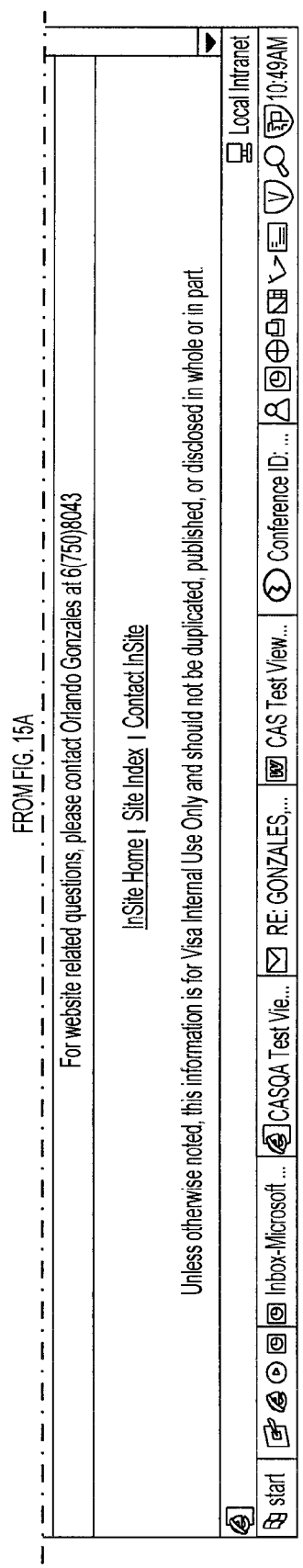

From the status report page 120 of FIG. 5, selecting "Report Card" under Functional Testing and clicking "VIEW REPORT" generates a project selection page 300 (see FIG. 15) that lists all of the projects in an install plan. FIG. 15 shows all of the projects for an install date of Oct. 12, 2007. To the left of each project is a check box 302. Checking the check boxes 302 for selected projects and clicking on "View Report" generates a selected projects report page 320 (see FIG. 16). The selected projects report page 320 is similar to the status report page 280 of FIG. 14, except that for each project selected, the report lists detailed test progress data for each application for that project.

Figure 16A:
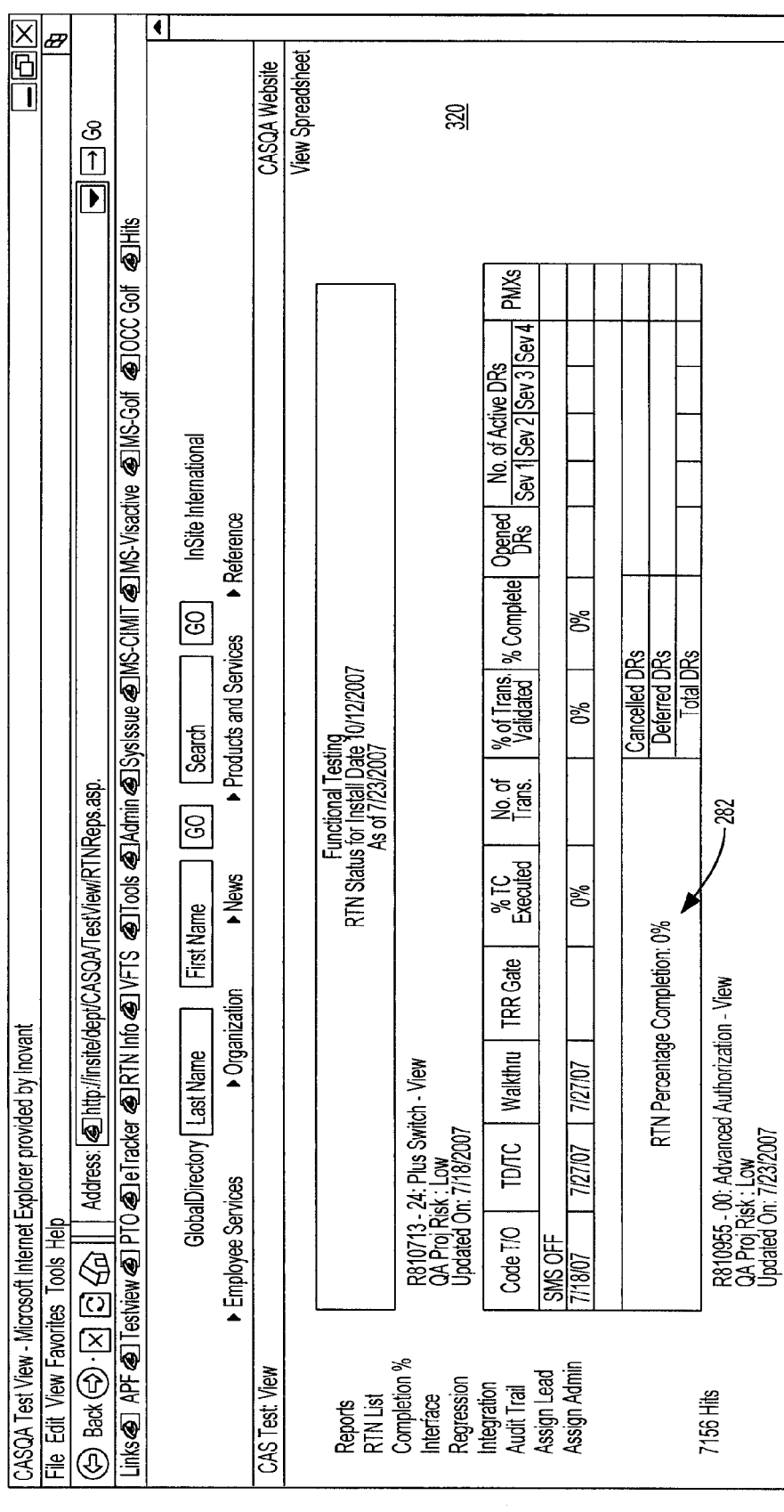
FIG. 16 is a screen shot of a status report page that summarizes the progress of a particular software install plan by software projects.
Figure 20:
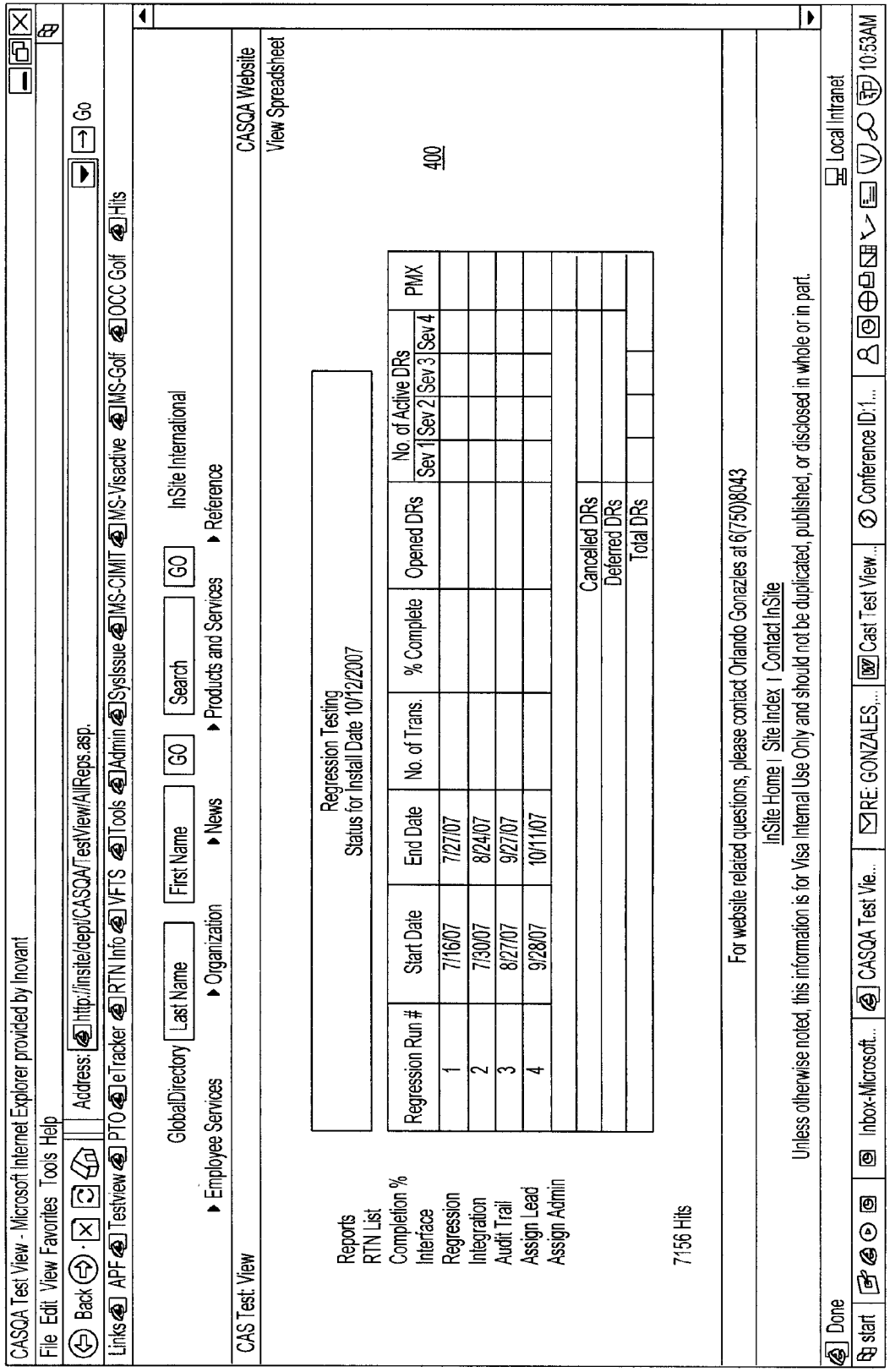
FIG. 20 is a screen shot of a status report page that summarizes the progress of regression tests.

For each project selected in the project selection page 300, the report 320 as shown in FIG. 16 includes, among others, the project identifier (RTN), project name (Name), project risk (QA Proj Risk), the number of cancelled and deferred bugs ("Cancelled DRs" and "Deferred DRs"), and project progress value 282 ("RTN Percentage Completion").

Moreover, the report 320 includes a detailed breakdown of test progress data for each application of each selected project including the percentage of transactions that have been executed ("% TC Executed"), percentage of validated transactions ("% of Trans. Validated"), application test progress value ("% Complete"), number of opened bug reports ("OpenedDR"s), number of active bug reports (No. of Active DRs") and their severity (sev1 through sev4), and the number of cancelled and deferred bug reports. The report page 320 also includes a project progress indicator ("RTN Percentage Completion") which represents the test completion percentage of the project.

Referring back to FIG. 5, selecting "My RTN" and clicking "VIEW REPORT" generates a personal project selection page 300 (see FIG. 17) which lists all of the projects that have been assigned to a particular tester across different software install dates in the future. The personal project selection page 300 is similar to the project selection page 300, except that the projects available for selection in page 300 include all projects across different install plans. For example, projects R810713 and R810955 are listed even though they belong to different install plans.

Figure 18A:
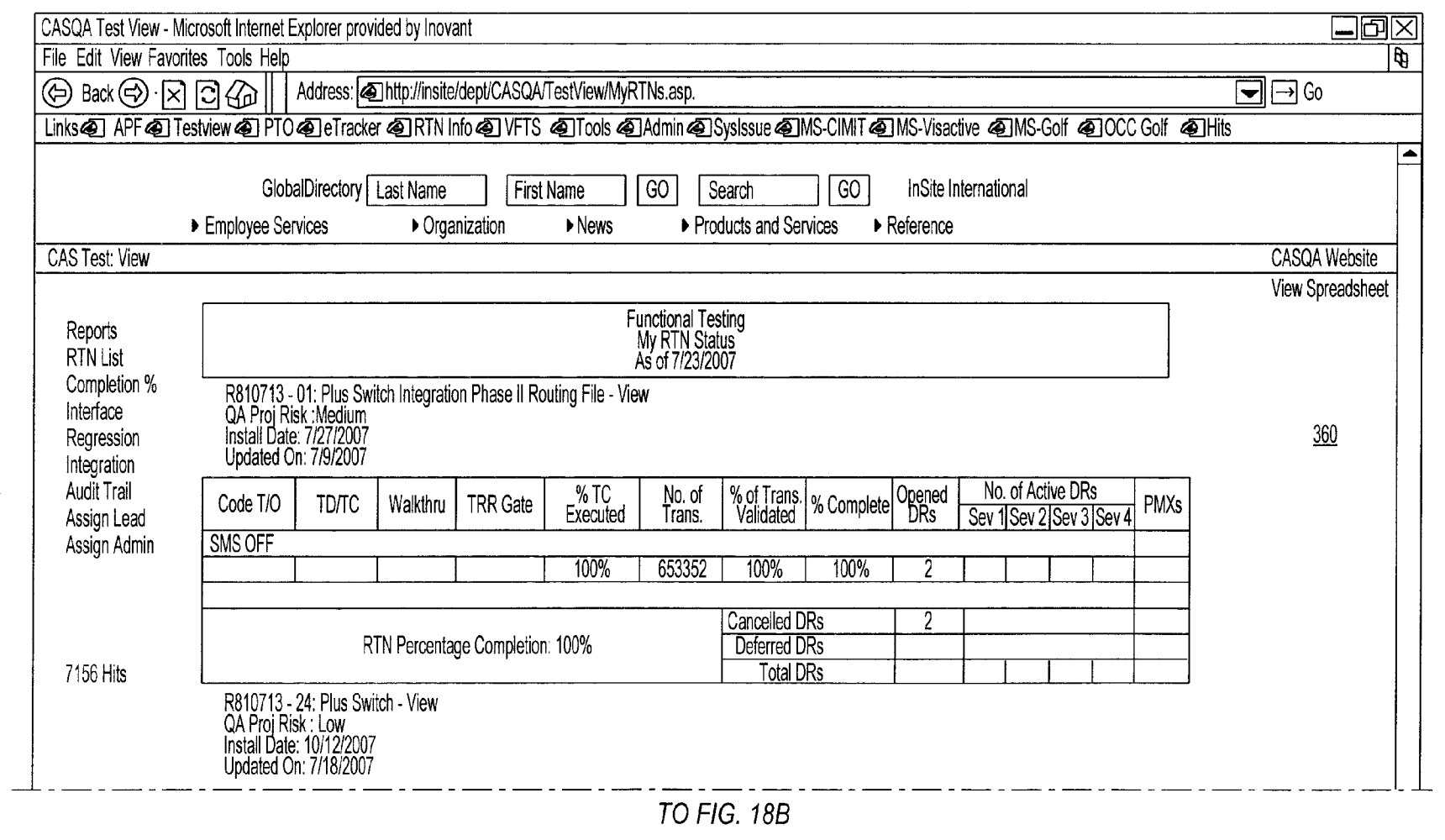

In FIG. 17, selecting check boxes 342 for selected projects and clicking on "View Report" generates a personal status report page 360 as shown in FIG. 18. The report page 360 is similar to the projects report page 320, but that it also displays an install date for each project as the date can be different from project to project.

Referring back to FIG. 5, selecting "Report Card" under Interface Testing and clicking "VIEW REPORT" generates an interface test progress report page 380 (see FIG. 19) which summarizes the progress of interface testing for a particular install plan. As in other reports such as the projects report 320, the interface test progress report 380 includes the number of transactions to be tested, interface test progress value ("% Complete) which is calculated by multiplying "% Test Data Created" by "% of Trans Validated" (see FIG. 9), and various data regarding the bug reports DR. In addition, the interface test progress report 380 includes a list of projects that are participating in the interface test. The list of participating projects is obtained from the "Interface" attribute (see FIG. 6).

Referring back to FIG. 5, selecting "Report Card" under Regression Testing and clicking "VIEW REPORT" generates a regression test progress report page 400 (see FIG. 20) which summarizes the progress of regression testing for a particular install plan. As in other reports such as the interface test progress report 380, the regression test progress report 400 includes the number of transactions to be tested, regression test progress value ("% Complete) which is calculated by multiplying "% Test Data Created" by "% of Trans Validated" (see FIG. 10), and various data regarding the bug reports DR.

Again referring back to FIG. 5, selecting "Report Card" under Integration Testing and clicking "VIEW REPORT" generates an integration test progress report page 420 (see FIG. 21) which summarizes the progress of integration testing for each project of a particular install plan. As in other reports, the integration test progress report 420 includes for each project the number of transactions to be tested, integration test progress value ("% Complete) which is calculated by multiplying "% Test Data Created" by "% of Trans Validated" (see FIG. 11), and various data regarding the bug reports DR.

As can be seen by persons of ordinary skill in the art, the present invention provides a centralized database where the testers can add, update or delete applications, integration tests, regression tests, interface tests of a project and their corresponding status indicators. The status indicators include progress of testing, bug status and bug severity.

With the present invention, Instead of contacting individual testers in all projects, the manager can now go to the centralized database to generate reports that track in real time the current status of a particular project, what applications may be causing delays, how many bug reports are still open.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A computer-implemented method of tracking testing of a set of software modification projects, wherein each project affects one or more software applications, the method comprising:

providing a project database adapted to store a plurality of project data with each project data corresponding to an associated software modification, each project data containing one or more application data corresponding to an associated application being affected by each project and containing an application test progress indicator updatable by a tester, the application test progress indicator being indicative of a test completion percentage for the associated application; and responsive to a status report request, performing the following:

retrieving selected ones of the plurality of project data from the project database; and preparing a status report based on the retrieved project data, the status report containing for each selected project a project progress value representing a test completion percentage for the each project, the project progress value being based on the application test progress indicators of the one or more applications being affected by each selected project.

2. The method according to claim 1, wherein the application test progress indicator includes:

a test case count indicative of the number of test cases to be tested, each test case including one or more transactions to be tested; and a transaction validation indicator indicative of a percentage of transactions that have been validated.

3. The method according to claim 2, wherein the step of preparing a status report includes determining the project progress value based on the test case count and the transaction validation indicator for the one or more applications.

4. The method according to claim 1, further comprising calculating an overall test progress value representing the overall progress of testing the set of software modification projects based on the test progress indicators contained in the retrieved project data.

5. The method according to claim 4, wherein:

each project data contains a project risk indicator; and the step of preparing a status report includes calculating the overall test progress value based on the project risk indicators and the project progress values for the set of software modification projects.

6. The method according to claim 5, wherein the step of preparing a status report includes calculating the overall test progress value by weighting each project progress value based on the associated project risk indicator.

7. The method according to claim 1, wherein:

the step of preparing a status report includes generating the status report as a web page viewable by a web browser; and the method further comprises updating the data in the project database responsive to an update request received from a web browser.

8. The method according to claim 1, wherein:

the each project data in the project database contains information related to software bugs; and the status report contains a software bug indicator indicative of the number of active software bugs for the each project.

9. A system having a processor for tracking testing of a set of software modification projects, wherein each project affects one or more software applications, the system comprising:

a project database adapted to store a plurality of project data with each project data corresponding to an associated software modification project, each project data containing one or more application data corresponding to an associated application being affected by each project and containing an application test progress indicator updatable by a tester, the application test progress indicator being indicative of a test completion percentage for the associated application; and a project tracking module executable in a computer and coupled to the project database, the project tracking module operable to:
  receive a request for a status report on selected ones of the plurality of projects; and
  retrieve the project data associated with the selected projects from the project database and prepare a status report based on the retrieved project data, the status report containing for each selected project a project progress value representing a test completion percentage for the each project, the project progress value being based on the application test progress indicators of the one or more applications being affected by each selected project.

10. The system according to claim 9, wherein the application test progress indicator includes:
  a test case count indicative of the number of test cases to be tested, each test case including one or more transactions to be tested; and
  a transaction validation indicator indicative of a percentage of transactions that have been validated.

11. The system according to claim 10, wherein the project tracking module calculates the project progress value based on the test case count and the transaction validation indicator for the one or more applications.

12. The system according to claim 9, wherein the project tracking module is further operable to calculate an overall test progress value representing the overall progress of testing the set of software modification projects based on the test progress indicators contained in the plurality of project data.

13. The system according to claim 12, wherein:
  each project data contains a project risk indicator; and
  the project tracking module calculates the overall test progress value based on the project risk indicators and the project progress values for the set of software modification projects.

14. The system according to claim 13, wherein the project tracking module calculates the overall test progress value by weighting each project progress value based on the associated project risk indicator.

15. The system according to claim 9, wherein:
  the project tracking module generates the status report as a web page viewable by a web browser; and
  the data in the project database are adapted to be updatable by testers through a web browser.

16. The system according to claim 9, wherein:
  each project data in the project database contains information related to software bugs; and
  the status report contains a software bug indicator indicative of the number of active software bugs for the each project.

17. The system according to claim 9, wherein the set of software modification projects modify software code for a processing system that processes financial transactions involving financial presentation devices that are presentable to providers of goods or services.

18. A system having processor for tracking testing of a plurality of software modification projects to be installed as a software update package, wherein each software modification project affects one or more software applications, the system comprising:
  a project database adapted to store a plurality of project data with each project data corresponding to an associated software modification project, each project data containing one or more application data with each application data corresponding to an associated application being affected by the each project and containing an application test progress indicator updatable by a tester, the application test progress indicator being indicative of a test completion percentage for the associated application; and
  a project tracking module executable in a computer and coupled to the project database, the project tracking module operable to:
    receive a request for a status report on selected ones of the plurality of projects; and
    retrieve the project data associated with the selected projects from the project database and prepare the status report based on the retrieved project data, the status report containing for each selected project a project progress value representing a test completion percentage for the each project, the project progress value being based on the application test progress indicators of the one or more applications being affected by the each selected project.

19. The system according to claim 18, wherein the project tracking module is further operable to calculate an overall test progress value representing the overall progress of testing the set of software modification projects based on the application test progress indicators contained in the plurality of project data.

20. The system according to claim 19, wherein:
  each project data contains a project risk indicator; and
  the project tracking module calculates the overall test progress value based on the project risk indicators and the project progress values for the set of software modification projects.

21. The system according to claim 18, wherein:
  the project tracking module generates the status report as a web page viewable by a web browser; and
  the data in the project database are adapted to be updatable by testers through a web browser.

22. The system according to claim 18, wherein:
  each project data in the project database contains information related to software bugs;
  the status report contains a software bug indicator indicative of the number of active software bugs for the each project.

23. The system according to claim 18, wherein the set of software modification projects modify software code for a processing system that processes financial transactions involving financial presentation devices that are presentable to providers of goods or services.

* * * * *